(12) United States Patent
Wang et al.

(10) Patent No.: US 9,798,437 B2
(45) Date of Patent: Oct. 24, 2017

(54) INFORMATION PROCESSING METHOD AND ELECTRONIC DEVICE

(71) Applicant: Lenovo (Beijing) Co., Ltd., Beijing (CN)

(72) Inventors: Chao Wang, Beijing (CN); Guizhen Wang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 512 days.

(21) Appl. No.: 14/228,693

(22) Filed: Mar. 28, 2014

(65) Prior Publication Data

US 2015/0121270 A1    Apr. 30, 2015

(30) Foreign Application Priority Data

Oct. 28, 2013  (CN) .......................... 2013 1 0516539
Oct. 28, 2013  (CN) .......................... 2013 1 0518024
Oct. 29, 2013  (CN) .......................... 2013 1 0521517

(51) Int. Cl.
  *G06F 3/048*      (2013.01)
  *G06F 3/0481*     (2013.01)
  *G06F 3/0484*     (2013.01)

(52) U.S. Cl.
  CPC .......... *G06F 3/0481* (2013.01); *G06F 3/0484* (2013.01)

(58) Field of Classification Search
  CPC .............................. G06F 3/0481; G06F 3/0484
  See application file for complete search history.

(56) References Cited

U.S. PATENT DOCUMENTS

| | | | | |
|---|---|---|---|---|
| 4,783,648 A * | 11/1988 | Homma | ................... | G09G 5/14 715/794 |
| 5,666,498 A * | 9/1997 | Amro | ...................... | G09G 5/14 715/764 |
| 5,880,733 A * | 3/1999 | Horvitz | ............... | G06F 3/04815 345/427 |
| 6,025,841 A * | 2/2000 | Finkelstein | .......... | G06F 3/0481 715/803 |
| 6,429,883 B1 * | 8/2002 | Plow | ..................... | G06F 3/0481 715/768 |
| 6,600,500 B1 * | 7/2003 | Yamamoto | ........... | G06F 3/0481 715/779 |
| 2007/0226642 A1 * | 9/2007 | Soulier | ................. | G06F 3/0486 715/768 |

* cited by examiner

*Primary Examiner* — William Bashore
*Assistant Examiner* — Gregory A Distefano
(74) *Attorney, Agent, or Firm* — Harness, Dickey & Pierce, P.L.C.

(57) ABSTRACT

An information processing method and an electronic device are disclosed. The method includes: judging whether a display region of a second non-full-screen window is totally covered by a display region of a first non-full-screen window; and if the display region of the second non-full-screen window is totally covered by the display region of the first non-full-screen window, generating an adjustment instruction and adjusting the first non-full-screen window and/or the second non-full-screen window based on the adjustment instruction to make both the display region of the first non-full-screen window and the display region of the second non-full-screen window displayed partly or totally in the display region of the touch display unit, where the conversion parameter at least includes a parameter value, a matrix, a parameter group or a parameter set.

18 Claims, 14 Drawing Sheets

INFORMATION PROCESSING METHOD AND ELECTRONIC DEVICE

This application claims the priority to Chinese Patent Application 201310518024.1, entitled "INFORMATION PROCESSING METHOD AND ELECTRONIC DEVICE", filed with the Chinese State Intellectual Property Office on Oct. 28, 2013, and Chinese Patent Application 201310521517.0, entitled "INFORMATION PROCESSING METHOD AND ELECTRONIC DEVICE", filed with the Chinese State Intellectual Property Office on Oct. 29, 2013, and Chinese Patent Application 201310516539.8, entitled "INFORMATION PROCESSING METHOD AND ELECTRONIC DEVICE", filed with the Chinese State Intellectual Property Office on Oct. 28, 2013, which are incorporated herein by reference in their entirety.

FIELD

The present disclosure relates to the field of wireless communication, and in particular to an information processing method and an electronic device.

BACKGROUND

With the development of the mobile terminal, and particularly with the increase of the resolution and size of the screen, the demand for multi-window display, i.e., multiple non-full-screen windows are opened in one mobile device at the same time with one application being displayed and operated in one non-full-screen window, is raised.

However, if multiple non-full-screen windows are in use, there may be cases that one or more of the non-full-screen windows are covered by a newly opened or adjusted non-full-screen window, and the content in the covered non-full-screen windows may be neglected by a user, so obtaining information by the user in real time can not be achieved; and the application in the covered non-full-screen window is still run but the effect of running the application is not achieved, which wastes processor resources.

In addition, control bars are displayed in the opened one or more non-full-screen windows, which causes visual confusion and affects user experience, and the multiple non-full-screen windows are not suitable for the user to use.

In addition, during adjusting the non-full-screen windows, the window being adjusted can not be distinguished explicitly, and the user can not see all the information content in the display region of the mobile phone during the adjusting.

SUMMARY

In view of the above, an information processing method is provided, which is applied to an electronic device, where the electronic device has a touch display unit, a plurality of applications are capable of being run on the electronic device and displayed in a display region of the touch display unit, a full-screen window of an application is converted by the electronic device by using a conversion parameter to obtain a non-full-screen window of the application, and in a case that N non-full-screen windows are opened, where N is greater than or equal to 2, the method includes:

judging whether a display region of a second non-full-screen window is totally covered by a display region of a first non-full-screen window; and if the display region of the second non-full-screen window is totally covered by the display region of the first non-full-screen window, generating an adjustment instruction and adjusting the first non-full-screen window and/or the second non-full-screen window based on the adjustment instruction to make both the display region of the first non-full-screen window and the display region of the second non-full-screen window displayed partly or totally in the display region of the touch display unit, where the conversion parameter at least includes a parameter value, a matrix, a parameter group or a parameter set.

Optionally, before the judging whether a display region of a second non-full-screen window is totally covered by a display region of a first non-full-screen window, the method further includes:

in a case that it is detected by the touch display unit a second operation performed on the first non-full-screen window, analyzing the second operation to obtain an analyzing result, and adjusting the display region of the first non-full-screen window based on the analyzing result.

Optionally, the adjusting the first non-full-screen window and/or the second non-full-screen window based on the adjustment instruction to make both the display region of the first non-full-screen window and the display region of the second non-full-screen window displayed partly or totally in the display region of the touch display unit includes:

adjusting a conversion matrix of the first non-full-screen window and/or the second non-full-screen window based on an adjustment parameter for adjusting the display region of the first non-full-screen window and/or the second non-full-screen window in the adjustment instruction; and adjusting position of the display region of the first non-full-screen window and/or the display region of the second non-full-screen window by using the conversion matrix to make both the display region of the first non-full-screen window and the display region of the second non-full-screen window displayed partly or totally in the display region of the touch display unit.

Optionally, the method further includes:

performing timing if it is detected that a first interaction event of the first non-full-screen window in an activated state is completed;

judging whether a second interaction event is processed in the first non-full-screen window, and stopping the timing if the second interaction event is processed in the first non-full-screen window; and if no second interaction event is processed in the first non-full-screen window, judging whether duration of the timing reaches a predetermined threshold; and if the duration of the timing reaches the predetermined threshold, generating a judgment result and changing a display parameter of the first non-full-screen window based on the judgment result to change a display effect of the first non-full-screen window.

Optionally, the display parameter includes at least one of a parameter indicative of whether to display, a parameter indicative of displaying color, and a parameter indicative of displaying transparency.

Optionally, the changing a display parameter of the first non-full-screen window based on the judgment result to change a display effect of the first non-full-screen window includes:

changing a display parameter of the first non-full-screen window and a display parameter of a functional region of the first non-full-screen window based on the judgment result, to change a display effect of the first non-full-screen window and a display effect of the functional region of the first non-full-screen window; or changing a display parameter of a functional region of the first non-full-screen window based on the judgment result, to change a display effect of the functional region of the first non-full-screen window.

Optionally, the method further includes:

receiving a second operation for adjusting the first non-full-screen window; and changing a display parameter of the first non-full-screen window during adjusting the first non-full-screen window in response to the second operation, to make the display region of the touch display unit not completely sheltered by the first non-full-screen window.

Optionally, the changing a display parameter of the first non-full-screen window during adjusting the first non-full-screen window includes:

determining a transparency parameter value based on a preset rule and displaying the first non-full-screen window based on the transparency parameter value during adjusting the first non-full-screen window, to make the first non-full-screen window transparent.

Optionally, the method further includes: determining a range of the transparency parameter value based on the preset rule, and displaying the first non-full-screen window based on the range of the transparency parameter value, to make the first non-full-screen window gradually changed from a completely transparent state to a non-transparent state during adjusting the first non-full-screen window.

Optionally, the method further includes, before the changing a display parameter of the first non-full-screen window during adjusting the first non-full-screen window in response to the second operation, obtaining an initial display parameter value of the first non-full-screen window and saving the initial display parameter value; and after the changing a display parameter of the first non-full-screen window during adjusting the first non-full-screen window in response to the second operation, changing the transparency parameter value to the initial display parameter value.

An electronic device is provided, which includes:

a touch display unit, adapted to convert a full-screen window of an application by using a conversion parameter to obtain a non-full-screen window of the application, and display N non-full-screen windows opened in a display region of the touch display unit, where N is greater than or equal to 2;

a processing unit, adapted to judge whether a display region of a second non-full-screen window is totally covered by a display region of a first non-full-screen window; and if the display region of the second non-full-screen window is totally covered by the display region of the first non-full-screen window, generate an adjustment instruction and adjust the first non-full-screen window and/or the second non-full-screen window based on the adjustment instruction to make both the display region of the first non-full-screen window and the display region of the second non-full-screen window displayed partly or totally in the display region of the touch display unit, where the conversion parameter at least includes a parameter value, a matrix, a parameter group or a parameter set.

Optionally, the touch display unit is further adapted to, in a case that a second operation performed on the first non-full-screen window is detected, analyze the second operation to obtain an analyzing result and adjust the display region of the first non-full-screen window based on the analyzing result.

Optionally, the touch display unit is adapted to adjust a conversion matrix of the first non-full-screen window and/or the second non-full-screen window based on an adjustment parameter for adjusting the display region of the first non-full-screen window and/or the second non-full-screen window in the adjustment instruction; and adjust position of the display region of the first non-full-screen window and/or the display region of the second non-full-screen window by using the conversion matrix to make both the display region of first non-full-screen window and the display region of the second non-full-screen window displayed partly or totally in the display region of the touch display unit.

Optionally, the processing unit is further adapted to perform timing if it is detected that a first interaction event of the first non-full-screen window in an activated state is completed;

judge whether a second interaction event is processed in the first non-full-screen window, and stop the timing if the second interaction event is processed in the first non-full-screen window; and if no second interaction event is processed in the first non-full-screen window, judge whether duration of the timing reaches a predetermined threshold; and if the duration of the timing reaches the predetermined threshold, generate a judgment result and change a display parameter of the first non-full-screen window based on the judgment result to change a display effect of the first non-full-screen window.

Optionally, the display parameter includes at least one of a parameter indicative of whether to display, a parameter indicative of displaying color, and a parameter indicative of displaying transparency.

Optionally, the processing unit is adapted to change a display parameter of the first non-full-screen window and a display parameter of a functional region of the first non-full-screen window based on the judgment result, to change a display effect of the first non-full-screen window and a display effect of the functional region of the first non-full-screen window; or the processing unit is adapted to change a display parameter of a functional region of the first non-full-screen window based on the judgment result, to change a display effect of the functional region of the first non-full-screen window.

Optionally, the processing unit includes:

a second receiving unit, adapted to receive a second operation for adjusting the first non-full-screen window; and a second responding unit, adapted to change a display parameter of the first non-full-screen window during adjusting the first non-full-screen window in response to the second operation, to make the display region of the touch display unit not completely sheltered by the first non-full-screen window.

Optionally, the second responding unit is further adapted to determine a transparency parameter value based on a preset rule and display the first non-full-screen window based on the transparency parameter value during adjusting the first non-full-screen window, to make the first non-full-screen window transparent.

Optionally, the second responding unit is further adapted to determine a range of the transparency parameter value based on the preset rule, and display the first non-full-screen window based on the range of the transparency parameter value, to make the first non-full-screen window gradually changed from a completely transparent state to a non-transparent state during adjusting the first non-full-screen window.

Optionally, the electronic device further includes:

a second obtaining unit, adapted to, before changing a display parameter of the first non-full-screen window during adjusting the first non-full-screen window in response to the second operation, obtain an initial display parameter value of the first non-full-screen window and save the initial display parameter value; and a recovering unit, adapted to, after the changing a display parameter of the first non-full-screen window during adjusting the first non-full-screen window in response to the second operation, change the transparency parameter value to the initial display parameter value.

With the information processing method and the electronic device of the present disclosure, in a case that there is a non-full-screen window totally covered, an adjustment instruction is generated to separate the two non-full-screen windows automatically, such that all of the non-full-screen windows can be displayed totally or partially in the display region of electronic device. Therefore, the user can obtain information in real time user experience is improved.

With the information processing method and electronic device of the present disclosure, timing is performed if an interaction event in a first non-full-screen window in an activated state is completed; it is judged whether the interaction event is processed in the first non-full-screen window and the timing is stopped if the interaction event is processed in the first non-full-screen window; if no interaction event is processed in the first non-full-screen window, it is judged whether duration of the timing reaches a predetermined threshold; and if the duration of the timing reaches the predetermined threshold, the display parameter of the first non-full-screen window is changed based on the judgment result to change the display effect of the first non-full-screen window. In this way, the display effect of the non-full-screen window can be changed automatically after a time period since a final operation of the non-full-screen window is completed. Therefore, the non-full-screen window becomes more suitable for the user to use and the visual experience is better.

With the information processing method and electronic device of the present disclosure, the display parameter of the non-full-screen window is changed during adjusting the window, so that the display region of the electronic device is not sheltered completely by the window. Therefore, the window being adjusted can be distinguished explicitly, and the user can see all the information content in the display region of the electronic device during the adjusting.

DETAILED DESCRIPTION

The present disclosure is described in detail below with reference to the accompanying drawings and embodiments.

Figure 1:
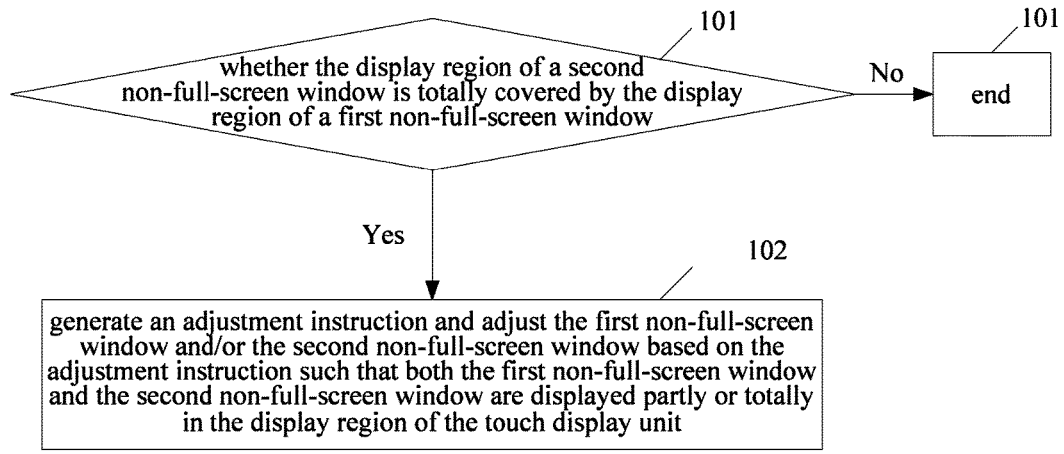
FIG. 1 is a flow chart of an information processing method according to an embodiment of the present disclosure.

An information processing method applied to an electronic device is provided according to an embodiment. The electronic device has a touch display unit and the electronic device may be a mobile terminal such as a mobile phone and a tablet. Multiple applications can be run on the electronic device and displayed in a display region of the touch display unit. In a case that N non-full-screen windows are opened, where N is greater than or equal to 2, the method includes the following steps S101 to S102 as shown in FIG. 1.

Step 101 is judging whether a display region of a second non-full-screen window is totally covered by a display region of a first non-full-screen window; proceeding to step 102 if the display region of the second non-full-screen window is totally covered by the display region of the first non-full-screen window; and ending the process if the display region of the second non-full-screen window is not totally covered by the display region of the first non-full-screen window.

Step 102 is generating an adjustment instruction and adjusting the first non-full-screen window and/or the second non-full-screen window based on the adjustment instruction such that both the display region of the first non-full-screen window and the display region of the second non-full-screen window are displayed partly or totally in the display region of the touch display unit.

The opening a non-full-screen window includes: selecting an application which can be run in a non-full-screen manner to obtain a default matrix; and converting, by using the default matrix, a full-screen window of the application to obtain the display region of the non-full-screen window of the application.

The converting, by using the default matrix, a full-screen window of the application to obtain the display region of the non-full-screen window of the application includes: reading graphics buffer data of the application; converting the graphics buffer data by using the default matrix; generating frame buffer data corresponding to the touch display unit by using the converted graphics buffer data; and displaying the non-full-screen window of the application in the touch display unit by using the frame buffer data.

The graphics buffer data may include: coordinate information and RGB (Red Green Blue) information of each pixel.

For a case that there may be an overlap region between two non-full-screen windows of two applications, coordination information of pixels in the graphic buffer data of the application corresponding to the non-full-screen window is set to three-dimensional coordinate $(x_o, y_o, z_o)$, and each non-full-screen window has a unique third dimension coordinate $z_o$. Therefore, the multiple non-full-screen windows may be differentiated by different third dimension coordinates $z_o$ if there is an overlap region between two on-full-screen windows or a non-full-screen window is totally covered by another non-full-screen window.

The default matrix may be a unit matrix. The expanded three-dimensional coordinate $(x_o, y_o, z_o)$ in the graphic buffer data may be converted by using the default matrix to obtain a non-full-screen window of the application. The graphic buffer data corresponding to the non-full-screen window includes the converted $(x_o, y_o, z_o)$ and RGB information of respective pixels.

In this way, the full-screen window of the application may be converted to a non-full-screen window of the application by the conversion matrix. Therefore, by providing multiple non-full-screen windows of applications, the user may flexibly view the content in any application running in a non-full-screen manner.

The judging whether the display region of a second non-full-screen window is totally covered by the display region of a first non-full-screen window includes:

judging whether the display region of the second non-full-screen window is totally covered by the display region of the first non-full-screen window based on the converted three-dimensional coordinates in the graphic buffer data corresponding to the first non-full-screen window and the second non-full-screen window.

Therefore, with the method of the embodiment, an adjusting instruction may be generated to separate two non-full-screen windows if one non-full-screen window is totally covered by another non-full-screen window, such that all the non-full-screen windows are presented for the user and the user experience is improved.

Figure 2:
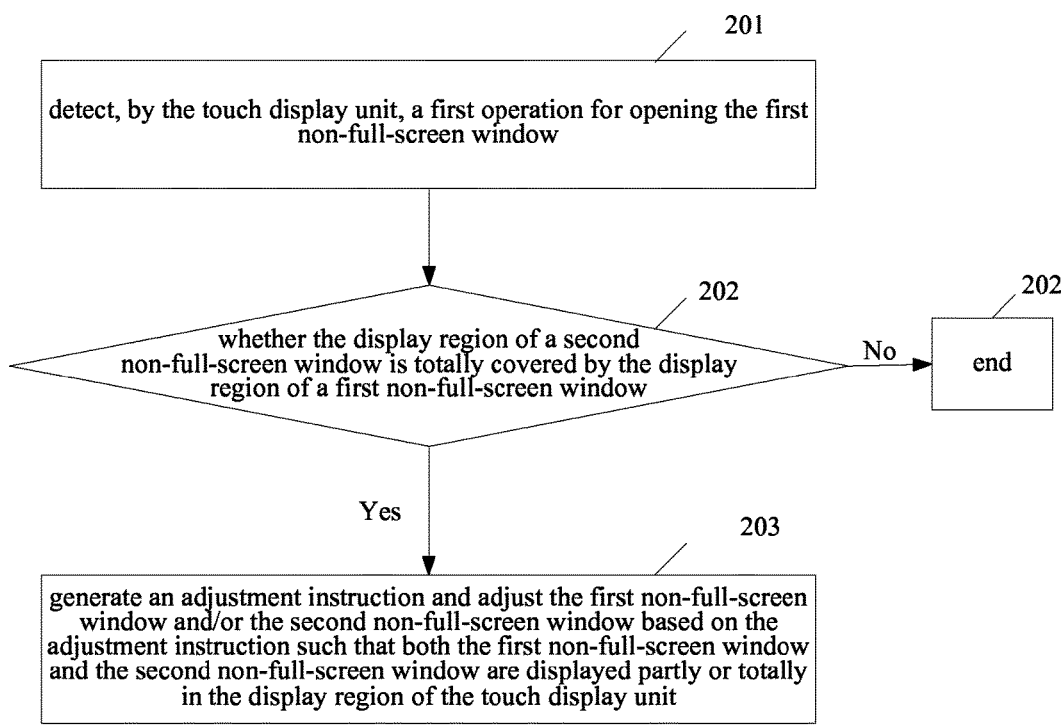
FIG. 2 is a flow chart of an information processing method according to an embodiment of the present disclosure.

An information processing method applied to an electronic device is further provided according to an embodiment of the disclosure. The electronic device has a touch display unit and the electronic device may be a mobile terminal such as a mobile phone and a tablet. Multiple applications can be run on the electronic device and displayed in a display region of the touch display unit. In a case that N non-full-screen windows are opened, where N is greater than or equal to 2, the method includes the following steps S201 to S203 as shown in FIG. 2.

Step 201 is detecting, by the touch display unit, a first operation for opening a first non-full-screen window.

Step 202 is judging whether a display region of a second non-full-screen window is totally covered by a display region of the first non-full-screen window; proceeding to step 203 if the display region of the second non-full-screen window is totally covered by the display region of the first non-full-screen window; and ending the process if the display region of the second non-full-screen window is not totally covered by the display region of the first non-full-screen window.

Step 203 is generating an adjustment instruction and adjusting the first non-full-screen window and/or the second non-full-screen window based on the adjustment instruction such that both the display region of the first non-full-screen window and the display region of the second non-full-screen window are displayed partly or totally in the display region of the touch display unit.

Preferably, the detecting, by the touch display unit, a first operation for opening a first non-full-screen window includes:

detecting, by the touch display unit, the first operation for selecting an application to be run in a non-full-screen manner; obtaining a default matrix; converting, by using the default matrix, a full-screen window of the application to obtain a display region of a non-full-screen window of the application; generating converted graphic buffer data of the application corresponding to the non-full-screen window by using the display region and RGB information of the non-full-screen window; generating frame buffer data corresponding to the touch display unit by using the converted graphics buffer data; and displaying the non-full-screen window based on the frame buffer data.

The converting, by using the default matrix, a full-screen window of the application to be run in a non-full-screen manner to obtain a display region of a non-full-screen window of the application includes: reading graphics buffer data of the application; converting the graphics buffer data by using the default matrix; generating the frame buffer data corresponding to the touch display unit by using the converted graphics buffer data; and displaying the non-full-screen window of the application in the touch display unit by using the frame buffer data.

The default matrix may be a unit matrix, and the graphics buffer data may include coordinate information and RGB (Red Green Blue) information of each pixel.

For a case that there may be an overlap region between two non-full-screen windows of two applications, coordination information of pixels in the graphic buffer data of the application corresponding to the non-full-screen window is set to three-dimensional coordinate $(x_o, y_o, z_o)$, and each non-full-screen window has a unique third dimension coordinate $z_o$. Therefore, the multiple non-full-screen windows may be differentiated by different third dimension coordinates $z_o$ if there is an overlap region between two on-full-screen windows or a non-full-screen window is totally covered by another non-full-screen window.

The expanded three-dimensional coordinate $(x_o, y_o, z_o)$ in the graphic buffer data may be converted by using the default matrix to obtain a non-full-screen window of the application. The graphic buffer data corresponding to the non-full-screen window includes converted ($x_o$, $y_o$, $z_o$) and RGB information of respective pixels.

Figure 3:
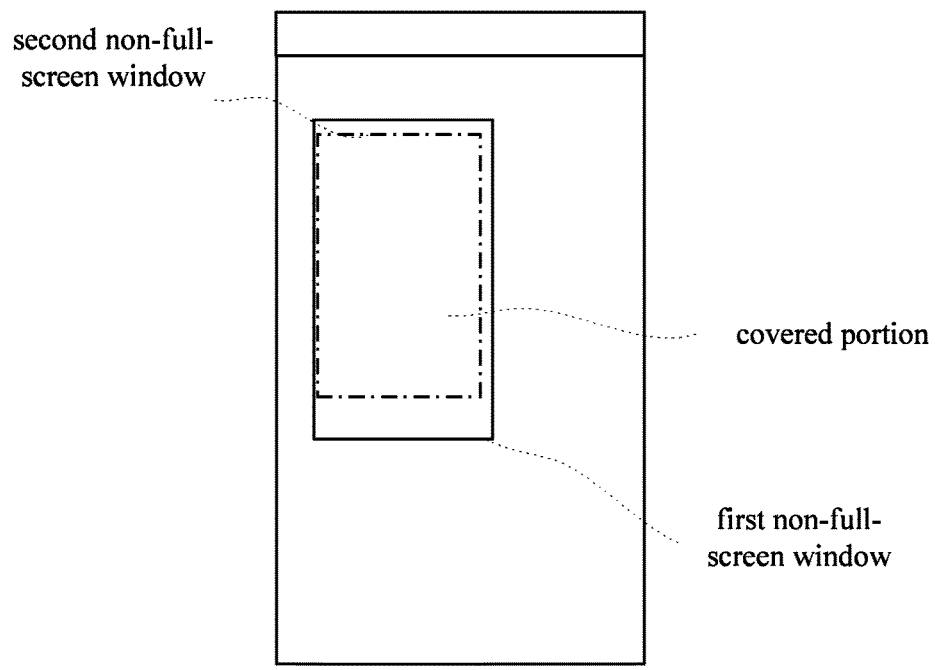
FIG. 3 is a schematic diagram illustrating that a second non-full-screen window is totally covered by a first non-full-screen window according to an embodiment of the present disclosure.

Preferably, the judging whether the display region of the second non-full-screen window is totally covered by the display region of the first non-full-screen window includes:

judging whether the display region of the second non-full-screen window is totally covered by the display region of the first non-full-screen window based on the converted three-dimensional coordinates in the graphic buffer data corresponding to the first non-full-screen window and the second non-full-screen window. For example, as shown in FIG. 3, the second non-full-screen window is totally covered by the first non-full-screen window.

Figure 4:
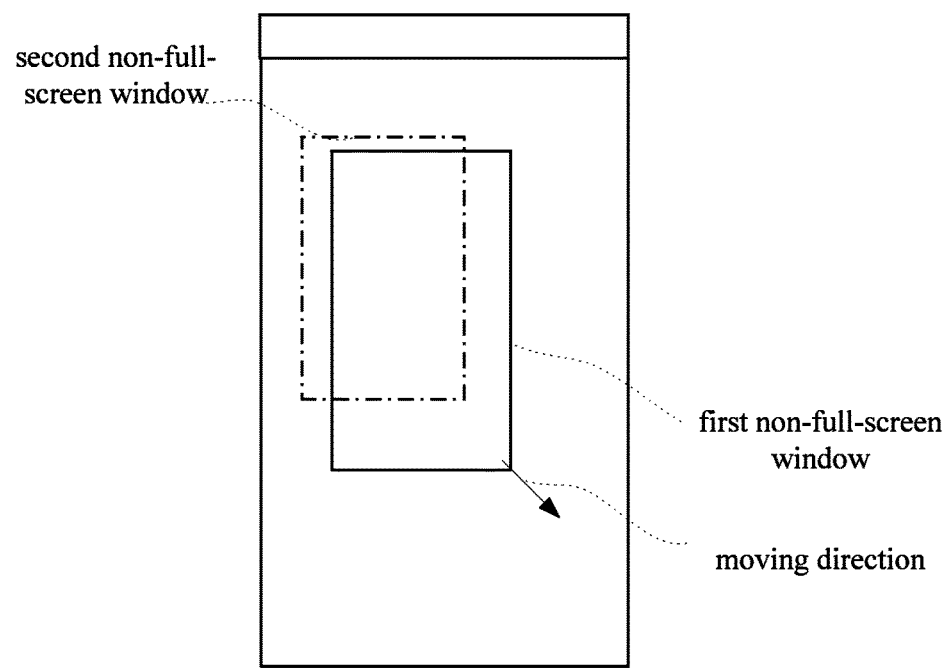
FIG. 4 is a schematic diagram of adjusting a non-full-screen window based on an adjustment instruction according to an embodiment of the present disclosure.

Preferably, the generating an adjustment instruction may include: moving the display region of the first non-full-screen window by a predetermined distance along a predetermined direction and/or scaling down the display region of the first non-full-screen window by a predetermined proportion. As shown in FIG. 4, the first non-full-screen window is moved to the bottom right by a predetermined distance such that the first non-full-screen and the second non-full-screen are separated.

Figure 5:
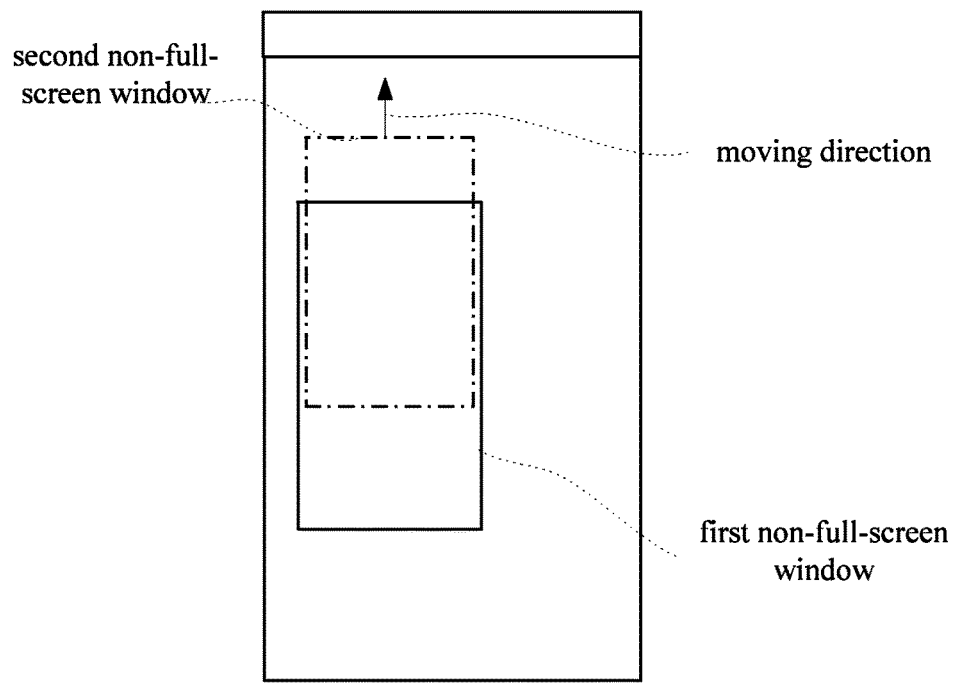
FIG. 5 is a schematic diagram of adjusting a non-full-screen window based on an adjustment instruction according to an embodiment of the present disclosure.

Alternatively, the generating an adjustment instruction may include: moving the display region of the second non-full-screen window by a predetermined distance along a predetermined direction and/or scaling down the display region of the second non-full-screen window by a predetermined proportion. As shown in FIG. 5, the second non-full-screen window is moved upward by a predetermined distance such that the first non-full-screen and the second non-full-screen are separated.

Figure 6:
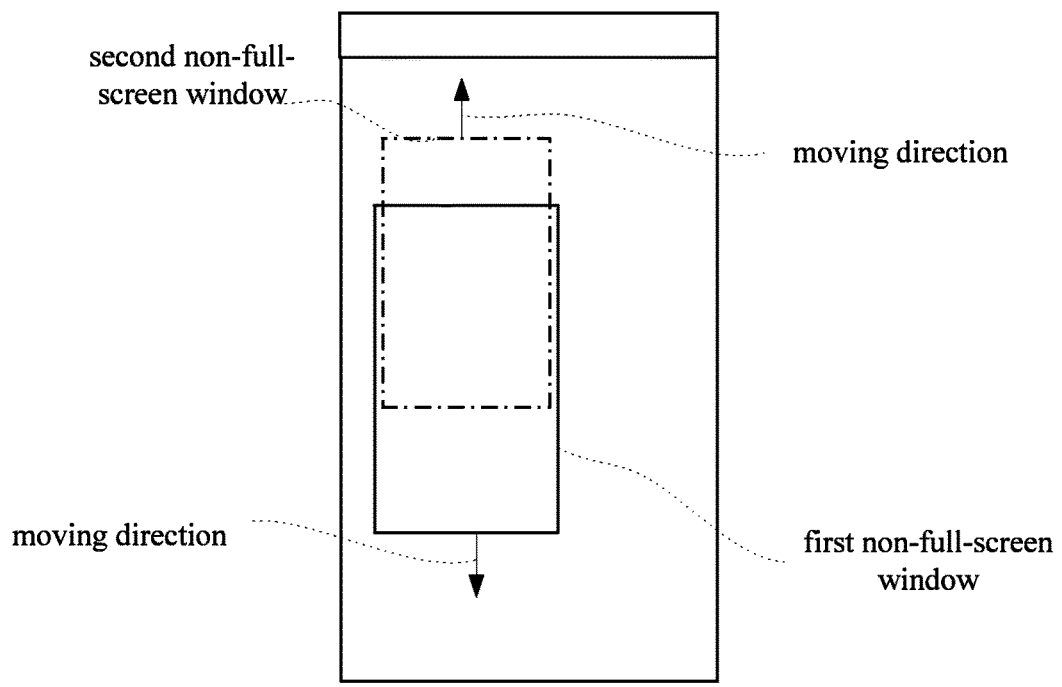
FIG. 6 is a schematic diagram of adjusting a non-full-screen window based on an adjustment instruction according to an embodiment of the present disclosure.

Alternatively, the generating an adjustment instruction may include: moving the display region of the first non-full-screen by a predetermined distance along a direction and moving the display region of the second non-full-screen by a predetermined distance along an opposite direction. As shown in FIG. 6, the second non-full-screen window is moved upward by a predetermined distance and the first non-full-screen window is moved downward by a predetermined distance such that the first non-full-screen and the second non-full-screen are separated.

Preferably, the adjusting the first non-full-screen window and/or the second non-full-screen window based on the adjustment instruction such that both the display region of the first non-full-screen window and the display region of the second non-full-screen window are displayed partly or totally in the display region of the touch display unit includes:

adjusting the conversion matrix of the first non-full-screen window and/or the second non-full-screen window based on the adjustment parameter for adjusting the display region of the first non-full-screen window and/or the second non-full-screen window in the adjustment instruction; and adjusting position of the display region of the first non-full-screen window and/or the display region of the second non-full-screen window by using the conversion matrix such that both the display region of first non-full-screen window and the display region of the second non-full-screen window are displayed partly or totally in the display region of the touch display unit.

The adjusting the display region of the first non-full-screen window may be adjusting the conversion matrix of the first non-full-screen window. For example, if the first non-full-screen window is scaled down by ½ times, the conversion matrix of the first non-full-screen window is adjusted to $$\begin{pmatrix} 1/2 & 0 & 0 \\ 0 & 1/2 & 0 \\ 0 & 0 & 1/2 \end{pmatrix}$$

based on the adjustment instruction, and the three-dimensional coordinate of each pixel ($x_o$, $y_o$, $z_o$) in the frame buffer data corresponding to the second non-full-screen window is:

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix}.$$

If the second non-full-screen window is further moved laterally by $\Delta x$ and longitudinally by $\Delta y$, the conversion matrix of the second non-full-screen window is $$\begin{pmatrix} 1/2 & 0 & \Delta x \\ 0 & 1/2 & \Delta y \\ 0 & 0 & 1/2 \end{pmatrix},$$

and the three-dimensional coordinates of each pixel ($x_o$, $y_o$, $z_o$) in the frame buffer data corresponding to the second non-full-screen window is:

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix}.$$

Therefore, with the method of the embodiment, if a new non-full-screen window of an application is opened, it is judge whether another non-full-screen window is totally covered the non-full-screen window. If another non-full-screen window is totally covered by the non-full-screen window, an adjustment instruction is generated to adjust the newly opened non-full-screen window of the application and/or the covered non-full-screen window, such that all the non-full-screen windows are presented for the user and the user experience is improved.

Figure 7:
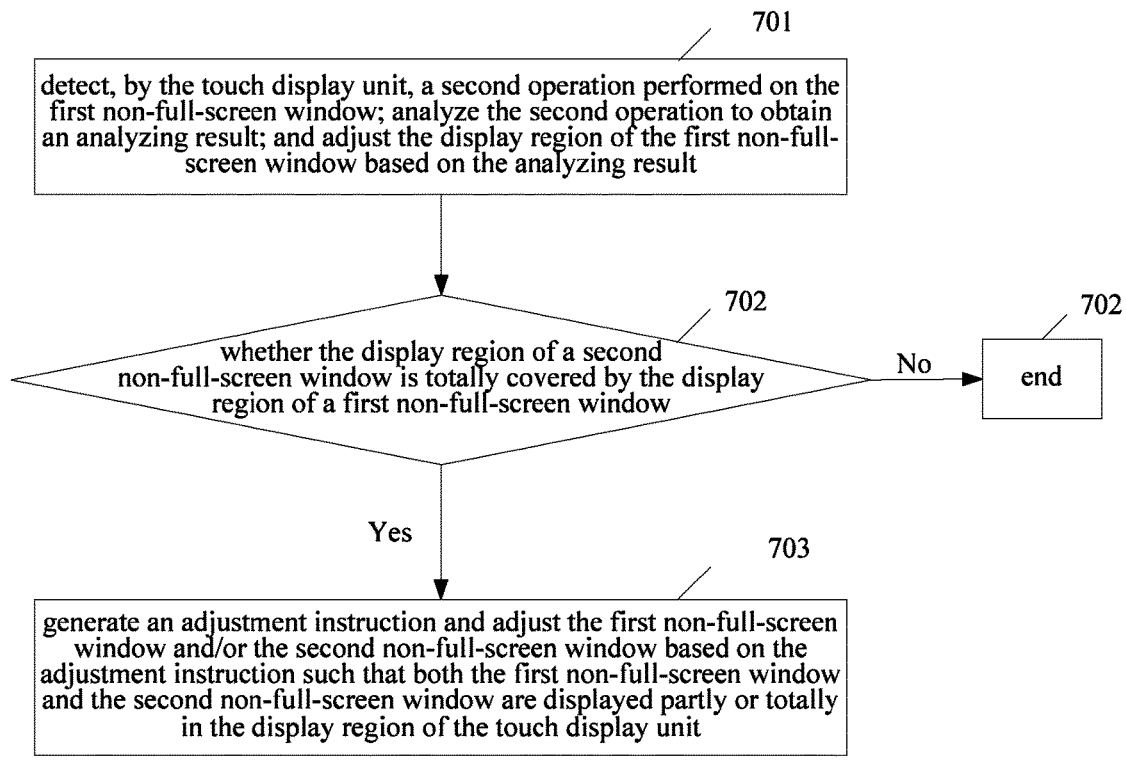
FIG. 7 is a flow chart of an information processing method according to an embodiment of the present disclosure.

An information processing method applied to an electronic device is further provided according to an embodiment of the disclosure. The electronic device has a touch display unit and the electronic device may be a mobile terminal such as a mobile phone and a tablet. Multiple applications can be run on the electronic device and displayed in a display region of the touch display unit. In a case that the electronic device is run in a non-full-screen manner and a non-full-screen window run in a non-full-screen manner is opened, the method includes the following steps S701 to S703 as shown in FIG. 7.

Step 701 is detecting, by the touch display unit, a second operation performed on the first non-full-screen window; analyzing the second operation to obtain an analyzing result; and adjusting the display region of the first non-full-screen window based on the analyzing result.

Step 702 is judging whether a display region of a second non-full-screen window is totally covered by a display region of the first non-full-screen window; proceeding to step 703 if the display region of the second non-full-screen window is totally covered by the display region of the first non-full-screen window; and ending the process if the display region of the second non-full-screen window is not totally covered by the display region of the first non-full-screen window.

Step 703 is generating an adjustment instruction and adjusting the first non-full-screen window and/or the second non-full-screen window based on the adjustment instruction such that both the display region of the first non-full-screen window and the display region of the second non-full-screen window are displayed partly or totally in the display region of the touch display unit.

Preferably, the opening a non-full-screen window run in a non-full-screen manner includes:

detecting, by the touch display unit, the first operation for selecting an application to be run in a non-full-screen manner; obtaining a default matrix; converting, by using the default matrix, a full-screen window of the application to obtain a display region of a non-full-screen window of the application; generating converted graphic buffer data of the application corresponding to the non-full-screen window by using the display region and RGB information of the non-full-screen window; generating frame buffer data corresponding to the touch display unit by using the converted graphics buffer data; and displaying the non-full-screen window based on the frame buffer data.

The converting, by using the default matrix, a full-screen window of the application to be run in a non-full-screen manner to obtain a display region of a non-full-screen window of the application includes: reading graphics buffer data of the application; converting the graphics buffer data by using the default matrix; generating the frame buffer data corresponding to the touch display unit by using the converted graphics buffer data; and displaying the non-full-screen window of the application in the touch display unit by using the frame buffer data.

The default matrix may be a unit matrix, and the graphics buffer data may include coordinate information and RGB (Red Green Blue) information of each pixel.

The detecting, by the touch display unit, a second operation performed on the first non-full-screen window, analyzing the second operation to obtain an analyzing result and adjusting the display region of the first non-full-screen window based on the analyzing result includes: obtaining the number of touch points of the second operation and the starting coordinate and ending coordinate of each of the touch points, as an analyzing result of the second operation; and adjusting the conversion matrix of the first non-full-screen window by using the analyzing result.

Preferably, for a case that there may be an overlap region between two non-full-screen windows of two applications, coordination information of pixels in the graphic buffer data of the application corresponding to the non-full-screen window is set to three-dimensional coordinate $(x_o, y_o, z_o)$, and each non-full-screen window has a unique third dimension coordinate $z_o$. Therefore, the multiple non-full-screen windows may be differentiated by different third dimension coordinates $z_o$ if there is an overlap region between two on-full-screen windows or a non-full-screen window is totally covered by another non-full-screen window.

The expanded three-dimensional coordinate $(x_o, y_o, z_o)$ in the graphic buffer data may be converted by using the default matrix to obtain a non-full-screen window of the application. The graphic buffer data corresponding to the non-full-screen window includes converted $(x_o, y_o, z_o)$ and RGB information of respective pixels.

Preferably, the judging whether the display region of the second non-full-screen window is totally covered by the display region of the first non-full-screen window includes:

judging whether the display region of the second non-full-screen window is totally covered by the display region of the first non-full-screen window based on the converted three-dimensional coordinates in the graphic buffer data corresponding to the first non-full-screen window and the second non-full-screen window. For example, as shown in FIG. 3, the second non-full-screen window is totally covered by the first non-full-screen window.

Preferably, the generating an adjustment instruction may include: moving the display region of the first non-full-screen window by a predetermined distance along a predetermined direction and/or scaling down the display region of the first non-full-screen window by a predetermined proportion. As shown in FIG. 4, the first non-full-screen window is moved to the bottom right by a predetermined distance such that the first non-full-screen and the second non-full-screen are separated.

Alternatively, the generating an adjustment instruction may include: moving the display region of the second non-full-screen window by a predetermined distance along a predetermined direction and/or scaling down the display region of the second non-full-screen window by a predetermined proportion. As shown in FIG. 5, the second non-full-screen window is moved upward by a predetermined distance such that the first non-full-screen and the second non-full-screen are separated.

Alternatively, the generating an adjustment instruction may include: moving the display region of the first non-full-screen by a predetermined distance along a direction and moving the display region of the second non-full-screen by a predetermined distance along an opposite direction. As shown in FIG. 6, the second non-full-screen window is moved upward by a predetermined distance and the first non-full-screen window is moved downward by a predetermined distance such that the first non-full-screen and the second non-full-screen are separated.

Preferably, the adjusting the first non-full-screen window and/or the second non-full-screen window based on the adjustment instruction such that both the display region of the first non-full-screen window and the display region of the second non-full-screen window are displayed partly or totally in the display region of the touch display unit includes:

adjusting the conversion matrix of the first non-full-screen window and/or the second non-full-screen window based on the adjustment parameter for adjusting the display region of the first non-full-screen window and/or the second non-full-screen window in the adjustment instruction;

adjusting position of the display region of the first non-full-screen window and/or the display region of the second non-full-screen window by using the conversion matrix such that both the display region of first non-full-screen window and the display region of the second non-full-screen window are displayed partly or totally in the display region of the touch display unit.

The adjusting the display region of the first non-full-screen window may be adjusting the conversion matrix of the first non-full-screen window. For example, if the first non-full-screen window is scaled down by ½ times, the conversion matrix of the first non-full-screen window is adjusted to $$\begin{pmatrix} 1/2 & 0 & 0 \\ 0 & 1/2 & 0 \\ 0 & 0 & 1/2 \end{pmatrix}$$

based on the adjustment instruction, and the three-dimensional coordinate of each pixel $(x_o, y_o, z_o)$ in the frame buffer data corresponding to the second non-full-screen window is:

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix}.$$

If the second non-full-screen window is further moved laterally by $\Delta x$ and longitudinally by $\Delta y$, the conversion matrix of the second non-full-screen window is $$\begin{pmatrix} 1/2 & 0 & \Delta x \\ 0 & 1/2 & \Delta y \\ 0 & 0 & 1/2 \end{pmatrix},$$

and the three-dimensional coordinates of each pixel $(x_o, y_o, z_o)$ in the frame buffer data corresponding to the second non-full-screen window is:

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix}.$$

Therefore, with the method of the embodiment, if a non-full-screen window is adjusted, it is judged whether another non-full-screen window is totally covered by the adjusted non-full-screen window. If another non-full-screen window is totally covered by the adjusted non-full-screen window, an adjustment instruction is generated to adjust the adjusted non-full-screen window and/or the covered non-full-screen window, such that all the non-full-screen windows are presented for the user and the user experience is improved.

Figure 8:
FIG. 8 is a schematic structural diagram of an electronic device according to an embodiment of the present disclosure.

An electronic device is provided according to an embodiment of the present disclosure. The electronic device may be a mobile terminal such as a mobile phone and a tablet. As shown in FIG. 8, the electronic device includes a touch display unit and a processing unit.

The touch display unit is adapted to display a non-full-screen window opened in the display region.

The processing unit is adapted to judge whether a display region of a second non-full-screen window is totally covered by a display region of a first non-full-screen window in the touch display unit; and if the display region of the second non-full-screen window is totally covered by the display region of the first non-full-screen window; generate an adjustment instruction and adjust the first non-full-screen window and/or the second non-full-screen window based on the adjustment instruction such that both the display region of the first non-full-screen window and the display region of the second non-full-screen window are displayed partly or totally in the display region of the touch display unit.

Preferably, the processing unit is adapted to obtain a default matrix based on an application to be run in a non-full-screen manner selected in the touch display unit, and convert a full-screen window of the application by using the default matrix to obtain a display region of a non-full-screen window of the application in the touch display unit.

The processing unit is adapted to read graphics buffer data of the application in the touch display unit; convert the graphics buffer data by using the default matrix; generate frame buffer data corresponding to the touch display unit by using the converted graphics buffer data; and display the non-full-screen window of the application in the touch display unit by using the frame buffer data.

The graphics buffer data may include coordinate information and RGB (Red Green Blue) information of each pixel.

Preferably, for a case that there may be an overlap region between two non-full-screen windows of two applications, coordination information of pixels in the graphic buffer data of the application corresponding to the non-full-screen window is set to three-dimensional coordinate $(x_o, y_o, z_o)$, and each non-full-screen window has a unique third dimension coordinate $z_o$. Therefore, the multiple non-full-screen windows may be differentiated by different third dimension coordinates $z_o$ if there is an overlap region between two on-full-screen windows or a non-full-screen window is totally covered by another non-full-screen window.

The default matrix may be a unit matrix. The expanded three-dimensional coordinate $(x_o, y_o, z_o)$ in the graphic buffer data may be converted by using the default matrix to obtain the non-full-screen window of the application. The graphic buffer data corresponding to the non-full-screen window includes the converted $(x_o, y_o, z_o)$ and RGB information of respective pixels.

In this way, the full-screen window of the application may be converted to a non-full-screen window of the application by the conversion matrix. Therefore, by providing multiple non-full-screen windows of applications, the user may flexibly view the content in any application running in a non-full-screen manner.

Preferably, the processing unit is adapted to judge whether the display region of the second non-full-screen window is totally covered by the display region of the first non-full-screen window based on the converted three-dimensional coordinates in the graphic buffer data corresponding to the first non-full-screen window and the second non-full-screen window.

Therefore, with the electronic device of the embodiment, an adjusting instruction may be generated to separate two non-full-screen windows if one non-full-screen window is totally covered by another non-full-screen window, such that all the non-full-screen windows are presented for the user and the user experience is improved.

An electronic device is further provided according to an embodiment of the present disclosure. The electronic device may be a mobile terminal such as a mobile phone and a tablet. As shown in FIG. 8, the electronic device includes a touch display unit and a processing unit.

The touch display unit is adapted to display N non-full-screen windows running in a non-full-screen manner opened in the display region.

The processing unit is adapted to judge whether a display region of a second non-full-screen window is totally covered by a display region of a first non-full-screen window in the touch display unit; and if the display region of the second non-full-screen window is totally covered by the display region of the first non-full-screen window; generate an adjustment instruction and adjust the first non-full-screen window and/or the second non-full-screen window based on the adjustment instruction such that both the display region of the first non-full-screen window and the display region of the second non-full-screen window are displayed partly or totally in the display region of the touch display unit.

Preferably, the processing unit is adapted to obtain a default matrix based on an application to be run in a non-full-screen manner selected in the touch display unit, and convert a full-screen window of the application by using the default matrix to obtain a display region of a non-full-screen window of the application in the touch display unit.

The processing unit is adapted to read graphics buffer data of the application in the touch display unit; convert the graphics buffer data by using the default matrix; generate frame buffer data corresponding to the touch display unit by using the converted graphics buffer data; and display the non-full-screen window of the application in the touch display unit by using the frame buffer data.

The graphics buffer data may include coordinate information and RGB (Red Green Blue) information of each pixel.

Preferably, for a case that there may be an overlap region between two non-full-screen windows of two applications, coordination information of pixels in the graphic buffer data of the application corresponding to the non-full-screen window is set to three-dimensional coordinate $(x_o, y_o, z_o)$, and each non-full-screen window has a unique third dimension coordinate $z_o$. Therefore, the multiple non-full-screen windows may be differentiated by different third dimension coordinates $z_o$ if there is an overlap region between two on-full-screen windows or a non-full-screen window is totally covered by another non-full-screen window.

The default matrix may be a unit matrix. The expanded three-dimensional coordinate $(x_o, y_o, z_o)$ in the graphic buffer data may be converted by using the default matrix to obtain the non-full-screen window of the application. The graphic buffer data corresponding to the non-full-screen window includes the converted $(x_o, y_o, z_o)$ and RGB information of respective pixels.

In this way, the full-screen window of the application may be converted to a non-full-screen window of the application by the conversion matrix. Therefore, by providing multiple non-full-screen windows of applications, the user may flexibly view the content in any application running in a non-full-screen manner.

Preferably, the processing unit is adapted to judge whether the display region of the second non-full-screen window is totally covered by the display region of the first non-full-screen window based on the converted three-dimensional coordinates in the graphic buffer data corresponding to the first non-full-screen window and the second non-full-screen window.

Therefore, with the electronic device of the embodiment, an adjusting instruction may be generated to separate two non-full-screen windows if one non-full-screen window is totally covered by another non-full-screen window, such that all the non-full-screen windows are presented for the user and the user experience is improved.

The touch display unit is further adapted to open a first non-full-screen window if a first operation is detected.

The touch display unit is adapted to transmit information of the first operation to the processing unit if it is detected the first operation for selecting an application to be run in a non-full-screen manner; and display based on frame buffer data. Accordingly, the processing unit is adapted to obtain a default matrix after receiving the information of the first operation from the touch display unit; convert a full-screen window of the application to be run in a non-full-screen manner by using the default matrix to obtain a display region of a non-full-screen window of the application; generate converted graphics buffer data of the application corresponding to the non-full-screen window by using the display region of the non-full-screen window and the RGB information; and generate frame buffer data corresponding to the touch display unit by using the converted graphics buffer data.

The processing unit is adapted to read graphics buffer data of the application; convert the graphics buffer data by using the default matrix; generate frame buffer data corresponding to the touch display unit by using the converted graphics buffer data; and display the non-full-screen window of the application in the touch display unit by using the frame buffer data. The default matrix may be a unit matrix. The graphics buffer data may include coordinate information and RGB (Red Green Blue) information of each pixel.

For a case that there may be an overlap region between two non-full-screen windows of two applications, coordination information of pixels in the graphic buffer data of the application corresponding to the non-full-screen window is set to three-dimensional coordinate $(x_o, y_o, z_o)$, and each non-full-screen window has a unique third dimension coordinate $z_o$. Therefore, the multiple non-full-screen windows may be differentiated by different third dimension coordinates $z_o$ if there is an overlap region between two on-full-screen windows or a non-full-screen window is totally covered by another non-full-screen window.

The expanded three-dimensional coordinate $(x_o, y_o, z_o)$ in the graphic buffer data may be converted by using the default matrix to obtain a non-full-screen window of the application. The graphic buffer data corresponding to the non-full-screen window includes converted $(x_o, y_o, z_o)$ and RGB information of respective pixels.

It is judged whether the display region of the second non-full-screen window is totally covered by the display region of the first non-full-screen window based on the converted three-dimensional coordinates in the graphic buffer data corresponding to the first non-full-screen window and the second non-full-screen window. For example, as shown in FIG. 3, the second non-full-screen window is totally covered by the first non-full-screen window.

The processing unit is adapted to generate an adjustment instruction. The adjustment instruction may include an instruction for moving the display region of the first non-full-screen window by a predetermined distance along a predetermined direction and/or scaling down the display region of the first non-full-screen window by a predetermined proportion. As shown in FIG. 4, the first non-full-screen window is moved to the bottom right by a predetermined distance such that the first non-full-screen and the second non-full-screen are separated.

Alternatively, the adjustment instruction may include an instruction for moving the display region of the second non-full-screen window by a predetermined distance along a predetermined direction and/or scaling down the display region of the second non-full-screen window by a predetermined proportion. As shown in FIG. 5, the second non-full-screen window is moved upward by a predetermined distance such that the first non-full-screen and the second non-full-screen are separated.

Alternatively, the adjustment instruction may include an instruction for moving the display region of the first non-full-screen by a predetermined distance along a direction and moving the display region of the second non-full-screen by a predetermined distance along an opposite direction. As shown in FIG. 6, the second non-full-screen window is moved upward by a predetermined distance and the first non-full-screen window is moved downward by a predetermined distance such that the first non-full-screen and the second non-full-screen are separated.

Preferably, the processing unit is adapted to adjust the conversion matrix of the first non-full-screen window and/or the second non-full-screen window based on the adjustment parameter for adjusting the display region of the first non-full-screen window and/or the second non-full-screen window in the adjustment instruction; and adjust position of the display region of the first non-full-screen window and/or the display region of the second non-full-screen window by using the conversion matrix such that both the display region of first non-full-screen window and the display region of the second non-full-screen window are displayed partly or totally in the display region of the touch display unit.

The adjusting the display region of the first non-full-screen window may be adjusting the conversion matrix of the first non-full-screen window. For example, if the first non-full-screen window is scaled down by ½ times, the conversion matrix of the first non-full-screen window is adjusted to $$\begin{pmatrix} 1/2 & 0 & 0 \\ 0 & 1/2 & 0 \\ 0 & 0 & 1/2 \end{pmatrix}$$

based on the adjustment instruction, and the three-dimensional coordinate of each pixel $(x_o, y_o, z_o)$ in the frame buffer data corresponding to the second non-full-screen window is:

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix}.$$

If the second non-full-screen window is further moved laterally by $\Delta x$ and longitudinally by $\Delta y$, the conversion matrix of the second non-full-screen window is $$\begin{pmatrix} 1/2 & 0 & \Delta x \\ 0 & 1/2 & \Delta y \\ 0 & 0 & 1/2 \end{pmatrix},$$

and the three-dimensional coordinates of each pixel $(x_o, y_o, z_o)$ in the frame buffer data corresponding to the second non-full-screen window is:

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix}.$$

Therefore, with the electronic device of the embodiment, if a new non-full-screen window of an application is opened, it is judge whether another non-full-screen window is totally covered the non-full-screen window. If another non-full-screen window is totally covered by the non-full-screen window, an adjustment instruction is generated to adjust the newly opened non-full-screen window of the application and/or the covered non-full-screen window, such that all the non-full-screen windows are presented for the user and the user experience is improved.

An electronic device is further provided according to an embodiment of the present disclosure. The electronic device may be a mobile terminal such as a mobile phone and a tablet. As shown in FIG. 8, the electronic device includes a touch display unit and a processing unit.

The touch display unit is adapted to display N non-full-screen windows running in a non-full-screen manner opened in the display region.

The processing unit is adapted to judge whether a display region of a second non-full-screen window is totally covered by a display region of a first non-full-screen window in the touch display unit; and if the display region of the second non-full-screen window is totally covered by the display region of the first non-full-screen window; generate an adjustment instruction and adjust the first non-full-screen window and/or the second non-full-screen window based on the adjustment instruction such that both the display region of the first non-full-screen window and the display region of the second non-full-screen window are displayed partly or totally in the display region of the touch display unit.

Preferably, the processing unit is adapted to obtain a default matrix based on an application to be run in a non-full-screen manner selected in the touch display unit, and convert a full-screen window of the application by using the default matrix to obtain a display region of a non-full-screen window of the application in the touch display unit.

The processing unit is adapted to read graphics buffer data of the application in the touch display unit; convert the graphics buffer data by using the default matrix; generate frame buffer data corresponding to the touch display unit by using the converted graphics buffer data; and display the non-full-screen window of the application in the touch display unit by using the frame buffer data.

The graphics buffer data may include coordinate information and RGB (Red Green Blue) information of each pixel.

Preferably, for a case that there may be an overlap region between two non-full-screen windows of two applications, coordination information of pixels in the graphic buffer data of the application corresponding to the non-full-screen window is set to three-dimensional coordinate $(x_o, y_o, z_o)$, and each non-full-screen window has a unique third dimension coordinate $z_o$. Therefore, the multiple non-full-screen windows may be differentiated by different third dimension coordinates $z_o$ if there is an overlap region between two on-full-screen windows or a non-full-screen window is totally covered by another non-full-screen window.

The default matrix may be a unit matrix. The expanded three-dimensional coordinate $(x_o, y_o, z_o)$ in the graphic buffer data may be converted by using the default matrix to obtain the non-full-screen window of the application. The graphic buffer data corresponding to the non-full-screen window includes the converted $(x_o, y_o, z_o)$ and RGB information of respective pixels.

In this way, the full-screen window of the application may be converted to a non-full-screen window of the application by the conversion matrix. Therefore, by providing multiple non-full-screen windows of applications, the user may flexibly view the content in any application running in a non-full-screen manner.

Preferably, the processing unit is adapted to judge whether the display region of the second non-full-screen window is totally covered by the display region of the first non-full-screen window based on the converted three-dimensional coordinates in the graphic buffer data corresponding to the first non-full-screen window and the second non-full-screen window.

Therefore, with the electronic device of the embodiment, an adjusting instruction may be generated to separate two non-full-screen windows if one non-full-screen window is totally covered by another non-full-screen window, such that all the non-full-screen windows are presented for the user and the user experience is improved.

The touch display unit is adapted to transmit information of the first operation to the processing unit if it is detected the first operation of selecting an application to be run in a non-full-screen manner; and display based on frame buffer data. Accordingly, the processing unit is adapted to obtain a default matrix; convert a full-screen window of the application to be run in a non-full-screen manner by using the default matrix to obtain a display region of a non-full-screen window of the application; generate converted graphics buffer data of the application corresponding to the non-full-screen window by using the display region of the non-full-screen window and RGB information; and generate frame buffer data corresponding to the touch display unit by using the converted graphics buffer data.

The touch display unit is further adapted to detect a second operation performed on the first non-full-screen window; analyze the second operation to obtain an analyzing result; and adjust the display region of the first non-full-screen window based on the analyzing result.

The touch display unit is adapted to detect a second operation performed on the first non-full-screen window; analyze the second operation to obtain a second operation parameter; and transmit the second operation parameter to the processing unit, where the second operation parameter indicates the degree of the adjusting operation performed on the display region of the first non-full-screen window.

Accordingly, the processing unit is adapted to determine a first conversion matrix based on the second operating parameter; and adjust the display region of the first non-full-screen window by using the first conversion matrix to obtain the adjusted display region of the first non-full-screen window.

The processing unit is adapted to generate an adjustment instruction. The adjustment instruction may include an instruction for moving the display region of the first non-full-screen window by a predetermined distance along a predetermined direction and/or scaling down the display region of the first non-full-screen window by a predetermined proportion. As shown in FIG. 4, the first non-full-screen window is moved to the bottom right by a predetermined distance such that the first non-full-screen and the second non-full-screen are separated.

Alternatively, the adjustment instruction may include an instruction for moving the display region of the second non-full-screen window by a predetermined distance along a predetermined direction and/or scaling down the display region of the second non-full-screen window by a predetermined proportion. As shown in FIG. 5, the second non-full-screen window is moved upward by a predetermined distance such that the first non-full-screen and the second non-full-screen are separated.

Alternatively, the adjustment instruction may include an instruction for moving the display region of the first non-full-screen by a predetermined distance along a direction and moving the display region of the second non-full-screen by a predetermined distance along an opposite direction. As shown in FIG. 6, the second non-full-screen window is moved upward by a predetermined distance and the first non-full-screen window is moved downward by a predetermined distance such that the first non-full-screen and the second non-full-screen are separated.

The processing unit is adapted to adjust the conversion matrix of the first non-full-screen window and/or the second non-full-screen window based on the adjustment parameter for adjusting the display region of the first non-full-screen window and/or the second non-full-screen window in the adjustment instruction; and adjust position of the display region of the first non-full-screen window and/or the display region of the second non-full-screen window by using the conversion matrix such that both the display region of first non-full-screen window and the display region of the second non-full-screen window are displayed partly or totally in the display region of the touch display unit.

The adjusting the display region of the first non-full-screen window may be adjusting the conversion matrix of the first non-full-screen window. For example, if the first non-full-screen window is scaled down by ½ times, the conversion matrix of the first non-full-screen window is adjusted to $$\begin{pmatrix} 1/2 & 0 & 0 \\ 0 & 1/2 & 0 \\ 0 & 0 & 1/2 \end{pmatrix}$$

based on the adjustment instruction, and the three-dimensional coordinate of each pixel $(x_o, y_o, z_o)$ in the frame buffer data corresponding to the second non-full-screen window is:

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix}.$$

If the second non-full-screen window is further moved laterally by $\Delta x$ and longitudinally by $\Delta y$, the conversion matrix of the second non-full-screen window is $$\begin{pmatrix} 1/2 & 0 & \Delta x \\ 0 & 1/2 & \Delta y \\ 0 & 0 & 1/2 \end{pmatrix},$$

and the three-dimensional coordinates of each pixel $(x_o, y_o, z_o)$ in the frame buffer data corresponding to the second non-full-screen window is:

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix}.$$

Therefore, with the electronic device of the embodiment, in adjusting a non-full-screen window, it is judged whether another non-full-screen window is totally covered the adjusted non-full-screen window. If another non-full-screen window is totally covered by the adjusted non-full-screen window, an adjustment instruction is generated to adjust the adjusted non-full-screen window and/or the covered nonfull-screen window, such that all the non-full-screen windows are presented for the user and the user experience is improved.

Figure 9:
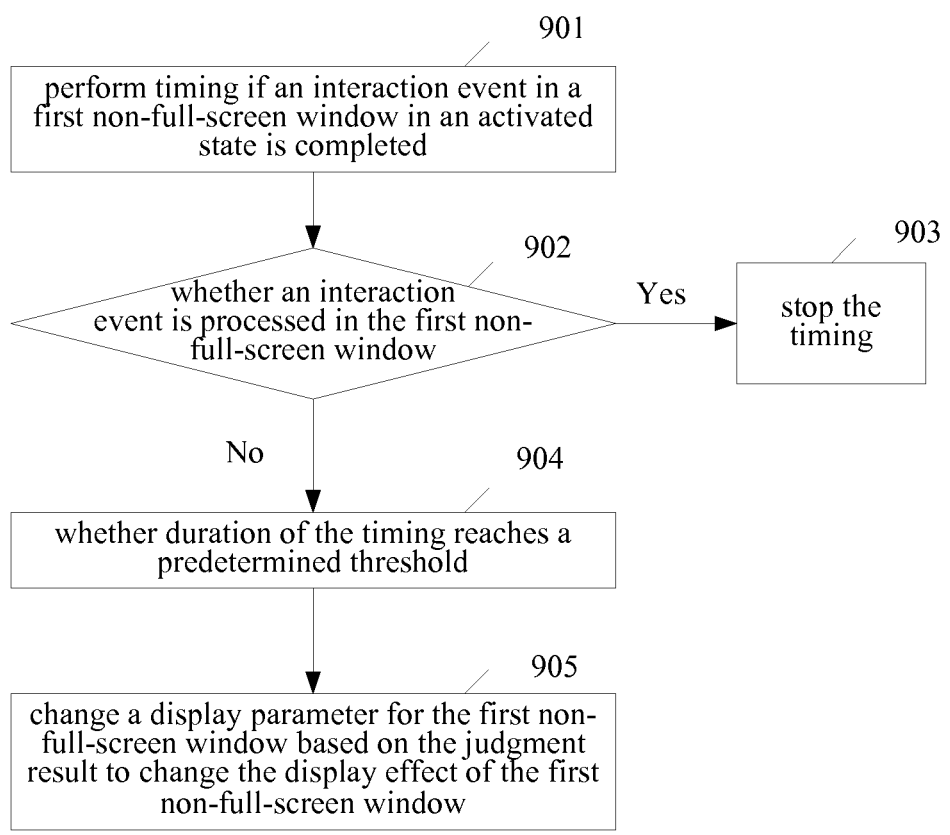
FIG. 9 is a flow chart of an information processing method according to an embodiment of the present disclosure.

An information processing method applied to an electronic device is provided according to an embodiment of the present disclosure. The electronic device may be a mobile terminal such as an intelligent mobile phone and a tablet computer. The electronic device converts a full-screen display window of an application by using a conversion parameter, to obtain a non-full-screen window of the application. In a case that M non-full-screen windows are opened on the electronic device, where M is greater than or equal to 1, the method includes the following steps S901 to S905 as illustrated in FIG. 9.

Step 901 is performing timing if an interaction event in a first non-full-screen window in an activated state is completed.

Step 902 is judging whether an interaction event is processed in the first non-full-screen window; proceeding to step 903 if the interaction event is processed in the first non-full-screen window; and proceeding to step 904 if no interaction event is not processed in the first non-full-screen window.

Step 903 is stopping the timing and ending the process.

Step 904 is judging whether duration of the timing reaches a predetermined threshold.

Step 905 is if the duration of the timing reaches the predetermined threshold, generating a judgment result and changing a display parameter of the first non-full-screen window based on the judgment result, to change the display effect of the first non-full-screen window.

The first non-full-screen window in the activated state may be the one of all the opened non-full-screen windows in which the last interaction event is performed. The interaction event may be the event responding to the user's touch operation.

The changing the display effect may include closing or opening the non-full-screen window, changing the color of the non-full-screen window, or changing the transparency of the non-full-screen window.

Preferably, the display parameter includes at least one of a parameter indicative of whether to display, a parameter indicative of displaying color, and a parameter indicative of displaying transparency.

Preferably, after step 903, it is return to step 901, i.e., another timing is performed after the interaction event in the first non-full-screen window in the activated state is completed.

The predetermined threshold may be a specified time period such as 30 seconds.

In this way, the display effect of the non-full-screen window can be changed automatically after a time period since the last operation in the non-full-screen window is completed, so that the non-full-screen window becomes more suitable for the user to use and the visual experience is better.

Figure 10:
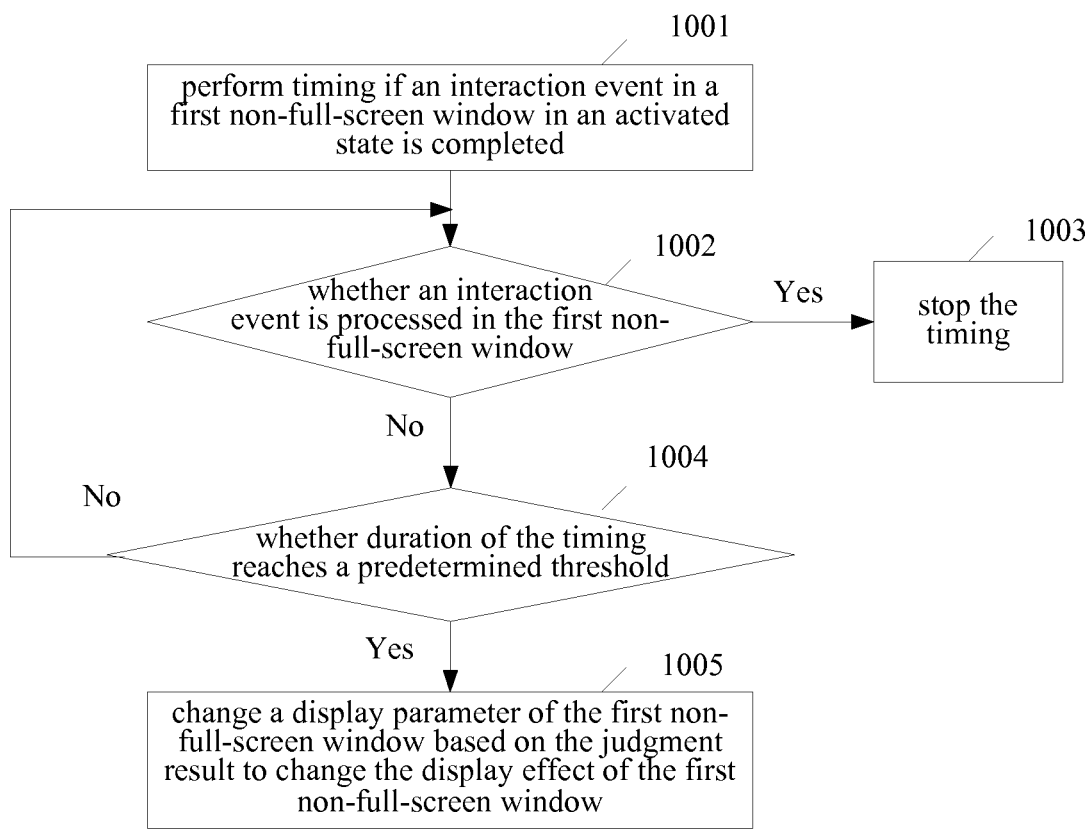
FIG. 10 is a flow chart of an information processing method according to an embodiment of the present disclosure.

An information processing method applied to an electronic device is further provided according to an embodiment of the present disclosure. The electronic device may be a mobile terminal such as an intelligent mobile phone and a tablet computer. The electronic device converts a full-screen display window of an application by using a conversion parameter, to obtain a non-full-screen window of the application. In a case that M non-full-screen windows are opened on the electronic device, where M is greater than or equal to 1, the method includes the following steps S1001 to S1005 as illustrated in FIG. 10.

Step 1001 is performing timing if an interaction event in a first non-full-screen window in an activated state is completed.

Step 1002 is judging whether an interaction event is processed in the first non-full-screen window; proceeding to step 1003 if the interaction event is processed in the first non-full-screen window; and proceeding to step 1004 if no interaction event is processed in the first non-full-screen window.

Step 1003 is stopping the timing and ending the process.

Step 1004 is judging whether duration of the timing reaches a predetermined threshold; proceeding to step 1005 if the duration of the timing reaches the predetermined threshold; and returning to step 1002 if the duration of the timing does not reach the predetermined threshold.

Step 1005 is changing a display parameter of the first non-full-screen window based on the judgment result to change the display effect of the first non-full-screen window.

The first non-full-screen window in the activated state may be the one of all the opened non-full-screen windows in which the last interaction event is performed. The interaction event may be the event responding to the user's touch operation.

The changing the display effect may include closing or opening the non-full-screen window, changing the color of the non-full-screen window, or changing the transparency of the non-full-screen window.

The display parameter includes at least one of a parameter indicative of whether to display, a parameter indicative of displaying color, and a parameter indicative of displaying transparency.

The changing a display parameter of the first non-full-screen window based on the judgment result to change the display effect of the first non-full-screen window includes:

changing a display parameter of the first non-full-screen window and a display parameter of a functional region of the first non-full-screen window based on the judgment result, to change the display effect of the first non-full-screen window and the display effect of the functional region of the first non-full-screen window.

The changing a display parameter of the first non-full-screen window and a display parameter of a functional region of the first non-full-screen window may include: extracting graphics buffer data corresponding to the first non-full-screen window and changing RGB (Red Green Blue) information and/or transparency information of each pixel in the graphics buffer data based on the judgment result; and extracting the graphics buffer data corresponding to the functional region of the first non-full-screen window and changing RGB information and/or transparency information of each pixel in the graphics buffer data corresponding to the functional region based on the judgment result.

The graphics buffer data includes position coordinate, RGB information and transparency information of each pixel.

Preferably, after step 1003, it is return to step 1001, i.e., timing is performed after the interaction event in the first non-full-screen window in the activated state is completed.

In this way, the display effect of the non-full-screen window can be changed automatically after a time period since the last operation in the non-full-screen window is completed, so that the non-full-screen window becomes more suitable for the user to use and the visual experience is better.

The opening a non-full-screen window run in a non-full-screen manner includes determining the application to be run in a non-full-screen manner to obtain a default parameter; and converting a full-screen display window of the application by using the default parameter, to obtain a display region of a non-full-screen window of the application.

The default parameter may be a default matrix.

The converting a display window of a selected application by using a default matrix to obtain a display region of a non-full-screen window of the application includes: reading graphics buffer data of the application; converting the graphics buffer data by using the default matrix and generating frame buffer data corresponding to the touch display unit by using the graphics buffer data; and displaying the non-full-screen window of the application in the touch display unit by using the frame buffer data.

For a case that there may be an overlap region between two non-full-screen windows of two applications, coordination information of pixels in the graphic buffer data of the application corresponding to the non-full-screen window is set to three-dimensional coordinate $(x_o, y_o, z_o)$, and each non-full-screen window has a unique third dimension coordinate $z_o$. Therefore, the multiple non-full-screen windows may be differentiated by different third dimension coordinates $z_o$ if there is an overlap region between two on-full-screen windows or a non-full-screen window is totally covered by another non-full-screen window.

The default matrix may be a unit matrix. The expanded three-dimensional coordinate $(x_o, y_o, z_o)$ in the graphic buffer data may be converted by using the default matrix to obtain the non-full-screen window of the application. The graphic buffer data corresponding to the non-full-screen window includes the converted $(x_o, y_o, z_o)$ and RGB information of respective pixels.

In this way, the full-screen window of the application may be converted to a non-full-screen window of the application by the conversion matrix. Therefore, by providing multiple non-full-screen windows of applications, the user may flexibly view the content in any application running in a non-full-screen manner.

Preferably, the non-full-screen window may be adjusted by adjusting the conversion matrix of the non-full-screen window.

For example, if the non-full-screen window scaled down by ½ times, the conversion matrix of the non-full-screen window is converted into $$\begin{pmatrix} 1/2 & 0 & 0 \\ 0 & 1/2 & 0 \\ 0 & 0 & 1/2 \end{pmatrix}$$

based on corresponding information, and the three-dimensional coordinate $(x_t, y_t, z_t)$ of each pixel in the frame buffer data corresponding to the non-full-screen window is:

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix};$$

If the non-full-screen window is further moved laterally by $\Delta x$ and longitudinally by $\Delta y$, the conversion matrix of the non-full-screen window is $$\begin{pmatrix} 1/2 & 0 & \Delta x \\ 0 & 1/2 & \Delta y \\ 0 & 0 & 1/2 \end{pmatrix},$$

and the three-dimensional coordinate $(x_t, y_t, z_t)$ of each pixel in the frame buffer data corresponding to the non-full-screen window is:

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix}.$$

Therefore, with the method of the embodiment, the display effect of the non-full-screen window and its corresponding functional region may be changed after a time period since the last operation in the non-full-screen window in the activated state is completed, so that the display of the non-full-screen window is diversified and user experience is improved.

Figure 11:
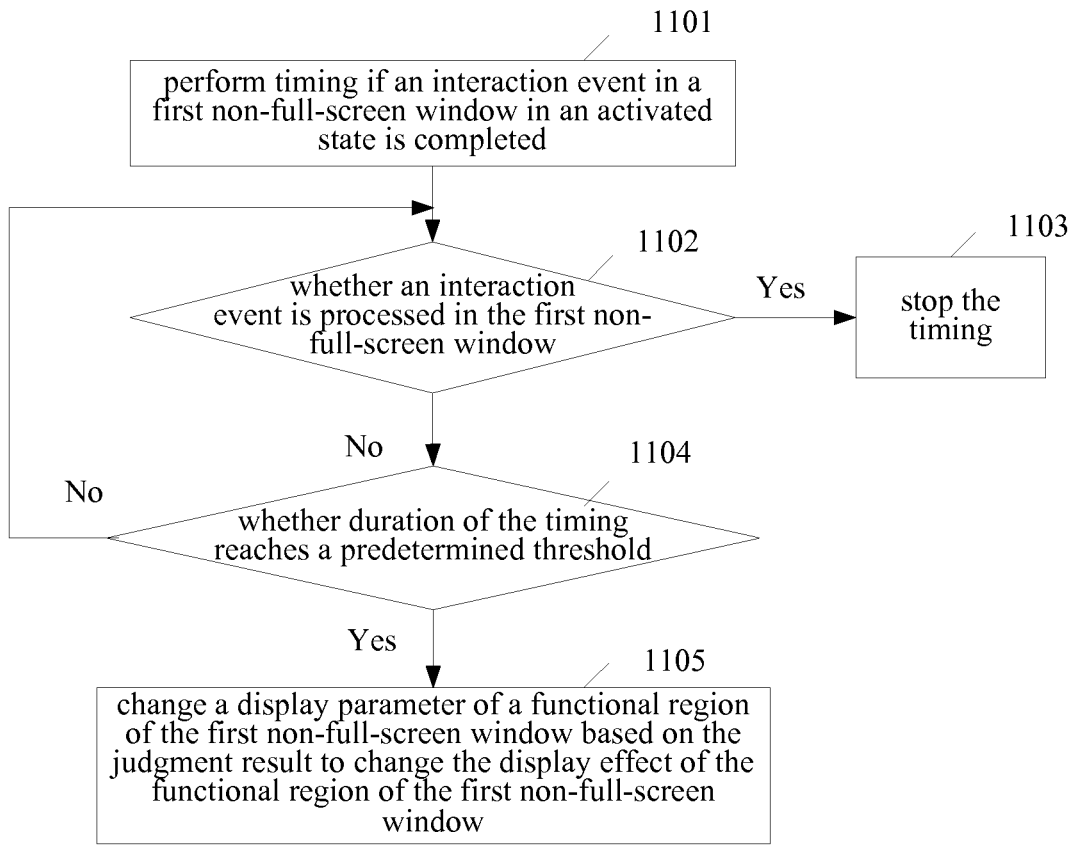
FIG. 11 is a flow chart of an information processing method according to an embodiment of the present disclosure.

An information processing method applied to an electronic device is further provided according to an embodiment of the present disclosure. The electronic device may be a mobile terminal such as an intelligent mobile phone and a tablet computer. The electronic device converts a full-screen display window of an application by using a conversion parameter, to obtain a non-full-screen window of the application. In a case that M non-full-screen windows are opened on the electronic device, where M is greater than or equal to 1, the method includes the following steps S1101 to S1105 as illustrated in FIG. 11.

Step 1101 is performing timing if an interaction event in a first non-full-screen window in an activated state is completed.

Step 1102 is judging whether an interaction event is processed in the first non-full-screen window; and proceeding to step 1103 if the interaction event is processed in the first non-full-screen window; and proceeding to step 1104 if no interaction event is processed in the first non-full-screen window.

Step 1103 is stopping the timing and ending the process.

Step 1104 is judging whether duration of the timing reaches a predetermined threshold; proceeding to step 1105 if the duration of the timing reaches the predetermined threshold; and returning to step 1102 if the duration of the timing does not reach the predetermined threshold.

Step 1105 is changing a display parameter of a functional region of the first non-full-screen window based on the judgment result to change the display effect of the functional region of the first non-full-screen window.

The first non-full-screen window in the activated state may be the one of all the opened non-full-screen windows in which the last interaction event is performed. The interaction event may be the event responding to the user's touch operation.

The changing the display effect may include closing or opening the non-full-screen window, changing the color of the non-full-screen window, or changing the transparency of the non-full-screen window.

The display parameter includes at least one of a parameter indicative of whether to display, a parameter indicative of displaying color, and a parameter indicative of displaying transparency.

The changing a display parameter of a functional region of the first non-full-screen window based on the judgment result to change the display effect of the functional region of the first non-full-screen window may include: extracting graphics buffer data corresponding to the functional region of the first non-full-screen window, and based on the judgment result, changing RGB (Red Green Blue) information and/or transparency information of each pixel in the graphics buffer data corresponding to the functional region or not displaying graphics buffer data corresponding to the functional region, i.e., not adding the graphics buffer data corresponding to the functional region into the next frame buffer data.

The graphics buffer data includes position coordinate, RGB information and transparency information of each pixel.

Preferably, after step 1103, it is return to step 1101, i.e., timing is performed after the interaction event in the first non-full-screen window in the activated state is completed.

In this way, the display effect of the non-full-screen window can be changed automatically after a time period since the last operation in the non-full-screen window is completed, so that the non-full-screen window becomes more suitable for the user to use and the visual experience is better.

The opening a non-full-screen window run in a non-full-screen manner includes determining the application to be run in a non-full-screen manner to obtain a default parameter; and converting a full-screen display window of the application by using the default parameter, to obtain a display region of a non-full-screen window of the application.

The converting a display window of a selected application by using a default matrix to obtain a display region of a non-full-screen window of the application includes: reading graphics buffer data of the application; converting the graphics buffer data by using the default matrix and generating frame buffer data corresponding to the touch display unit by using the graphics buffer data; and displaying the non-full-screen window of the application in the touch display unit by using the frame buffer data.

For a case that there may be an overlap region between two non-full-screen windows of two applications, coordination information of pixels in the graphic buffer data of the application corresponding to the non-full-screen window is set to three-dimensional coordinate $(x_o, y_o, z_o)$, and each non-full-screen window has a unique third dimension coordinate $z_o$. Therefore, the multiple non-full-screen windows may be differentiated by different third dimension coordinates $z_o$ if there is an overlap region between two on-full-screen windows or a non-full-screen window is totally covered by another non-full-screen window.

The default matrix may be a unit matrix. The expanded three-dimensional coordinate $(x_o, y_o, z_o)$ in the graphic buffer data may be converted by using the default matrix to obtain the non-full-screen window of the application. The graphic buffer data corresponding to the non-full-screen window includes the converted $(x_o, y_o, z_o)$ and RGB information of respective pixels.

In this way, the full-screen window of the application may be converted to a non-full-screen window of the application by the conversion matrix. Therefore, by providing multiple non-full-screen windows of applications, the user may flexibly view the content in any application running in a non-full-screen manner.

Preferably, the non-full-screen window may be adjusted by adjusting the conversion matrix of the non-full-screen window.

For example, if the non-full-screen window scaled down by ½ times, the conversion matrix of the non-full-screen window is converted into $$\begin{pmatrix} 1/2 & 0 & 0 \\ 0 & 1/2 & 0 \\ 0 & 0 & 1/2 \end{pmatrix}$$

based on corresponding information, and the three-dimensional coordinate $(x_t, y_t, z_t)$ of each pixel in the frame buffer data corresponding to the non-full-screen window is:

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix};$$

If the non-full-screen window is further moved laterally by $\Delta x$ and longitudinally by $\Delta y$, the conversion matrix of the non-full-screen window is $$\begin{pmatrix} 1/2 & 0 & \Delta x \\ 0 & 1/2 & \Delta y \\ 0 & 0 & 1/2 \end{pmatrix},$$

and the three-dimensional coordinate $(x_t, y_t, z_t)$ of each pixel in the frame buffer data corresponding to the non-full-screen window is:

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix}.$$

Preferably, after step 1105, the display effect of the functional region may be changed according to user's operation. For example, the functional region is displayed in the non-full-screen window in the activated state if it is judged that an interaction event begins to be performed in the non-full-screen window in the activated state.

Therefore, with the method of the embodiment, the display effect of the non-full-screen window and its corresponding functional region may be changed after a time period since the last operation in the non-full-screen window in the activated state is completed, so that the display of the non-full-screen window is diversified and user experience is improved.

Figure 12:
FIG. 12 is a schematic structural diagram of an electronic device according to an embodiment of the present disclosure.

An electronic device is further provided according to an embodiment of the present disclosure. The electronic device may be a mobile terminal such as an intelligent mobile phone and a tablet computer. As illustrated in FIG. 12, the electronic device includes a touch display unit and a processing unit.

The touch display unit is adapted to convert a full-screen display window of an application by using a conversion parameter, to obtain a non-full-screen window of the application; and display opened M non-full-screen windows in the display region, where N is greater than or equal to 1.

The processing unit is adapted to run multiple applications; perform timing if an interaction in a first non-full-screen window in an activated state is completed; judge whether an interaction event is processed in the first non-full-screen window; stop the timing if the interaction event is processed in the first non-full-screen window; and if no interaction event is processed in the first non-full-screen window, judge whether duration of the timing reaches a predetermined threshold; and if the duration of the timing reaches the predetermined threshold, generate an judgment result and change a display parameter of the first non-full-screen window based on the judgment result to change the display effect of the first non-full-screen window.

The first non-full-screen window in the activated state may be the one of all the opened non-full-screen windows in which the last interaction event is performed. The interaction event may be the event responding to the user's touch operation.

The changing the display effect may include closing or opening the non-full-screen window, changing the color of the non-full-screen window, or changing the transparency of the non-full-screen window.

Preferably, the display parameter includes at least one of a parameter indicative of whether to display, a parameter indicative of displaying color, and a parameter indicative of displaying transparency.

Preferably, the processing unit is further adapted to, after the timing stopped, perform another timing after the interaction event in the first non-full-screen window in the activated state is completed.

The predetermined threshold may be a specified time period such as 30 seconds.

In this way, the display effect of the non-full-screen window can be changed automatically after a time period since the last operation in the non-full-screen window is completed, so that the non-full-screen window becomes more suitable for the user to use and the visual experience is better.

An electronic device is further provided according to an embodiment of the present disclosure. The electronic device may be a mobile terminal such as an intelligent mobile phone and a tablet computer. The electronic device includes a touch display unit and a processing unit.

The touch display unit is adapted to convert a full-screen display window of an application by using a conversion parameter, to obtain a non-full-screen window of the application; and display opened M non-full-screen windows in the display region, where N is greater than or equal to 1.

The processing unit is adapted to run multiple applications; perform timing if an interaction event in a first non-full-screen window in an activated state is completed; judge whether an interaction event is processed in the first non-full-screen window; stop the timing if the interaction event is processed in the first non-full-screen window; and if no interaction event is processed in the first non-full-screen window, judge whether duration of the timing reaches a predetermined threshold; and if duration of the timing reaches the predetermined threshold, generate an judgment result and change a display parameter of the first non-full-screen window based on the judgment result to change the display effect of the first non-full-screen window.

The first non-full-screen window in the activated state may be the one of all the opened non-full-screen windows in which the last interaction event is performed. The interaction event may be the event responding to the user's touch operation. The changing the display effect may include closing or opening the non-full-screen window, changing the color of the non-full-screen window, or changing the transparency of the non-full-screen window.

The display parameter includes at least one of a parameter indicative of whether to display, a parameter indicative of displaying color, and a parameter indicative of displaying transparency.

The processing unit is adapted to change a display parameter of the first non-full-screen window and a display parameter of a functional region of the first non-full-screen window based on the judgment result to change the display effect of the first non-full-screen window and the functional region of the first non-full-screen window.

The processing unit is adapted to extract graphics buffer data of the first non-full-screen window and change RGB (Red, Green, Blue) information and/or transparency information of each pixel in the graphics buffer data based on the judgment result; and extract graphics buffer data of the functional region of the first non-full-screen window and change RGB information and/or transparency information of each pixel in the graphics buffer data of the functional region based on the judgment result.

The graphics buffer data includes position coordinate, RGB information and transparency information of each pixel.

Preferably, the processing unit is further adapted to, after the timing stopped, perform another timing if the interaction event in the first non-full-screen window in the activated state is completed.

In this way, the display effect of the non-full-screen window can be changed automatically after a time period since the last operation in the non-full-screen window is completed, so that the non-full-screen window becomes more suitable for the user to use and the visual experience is better.

The processing unit is further adapted to determine an application to be run in a non-full-screen manner to obtain a default matrix; and convert a full-screen display window of the application by using the default matrix to obtain a display area of a non-full-screen window of the application.

The processing unit is adapted to read graphics buffer data of the application; convert the graphics buffer data by using the default matrix; generate frame buffer data of the touch display unit by using the graphics buffer data; and display the non-full-screen window of the application in the touch display unit by using the frame buffer data.

For a case that there may be an overlap region between two non-full-screen windows of two applications, coordination information of pixels in the graphic buffer data of the application corresponding to the non-full-screen window is set to three-dimensional coordinate $(x_o, y_o, z_o)$, and each non-full-screen window has a unique third dimension coordinate $z_o$. Therefore, the multiple non-full-screen windows may be differentiated by different third dimension coordinates $z_o$ if there is an overlap region between two on-full-screen windows or a non-full-screen window is totally covered by another non-full-screen window.

The default matrix may be a unit matrix. The expanded three-dimensional coordinate $(x_o, y_o, z_o)$ in the graphic buffer data may be converted by using the default matrix to obtain the non-full-screen window of the application. The graphic buffer data corresponding to the non-full-screen window includes the converted $(x_o, y_o, z_o)$ and RGB information of respective pixels.

In this way, the full-screen window of the application may be converted to a non-full-screen window of the application by the conversion matrix. Therefore, by providing multiple non-full-screen windows of applications, the user may flexibly view the content in any application running in a non-full-screen manner.

Preferably, the non-full-screen window may be adjusted by adjusting the conversion matrix of the non-full-screen window.

For example, if the non-full-screen window scaled down by ½ times, the conversion matrix of the non-full-screen window is converted into $$\begin{pmatrix} 1/2 & 0 & 0 \\ 0 & 1/2 & 0 \\ 0 & 0 & 1/2 \end{pmatrix}$$

based on corresponding information, and the three-dimensional coordinate $(x_t, y_t, z_t)$ of each pixel in the frame buffer data corresponding to the non-full-screen window is:

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix};$$

If the non-full-screen window is further moved laterally by Δx and longitudinally by Δy, the conversion matrix of the non-full-screen window is $$\begin{pmatrix} 1/2 & 0 & \Delta x \\ 0 & 1/2 & \Delta y \\ 0 & 0 & 1/2 \end{pmatrix},$$

and the three-dimensional coordinate $(x_t, y_t, z_t)$ of each pixel in the frame buffer data corresponding to the non-full-screen window is:

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix}.$$

Therefore, with the method of the embodiment, the display effect of the non-full-screen window and its corresponding functional region may be changed after a time period since the last operation in the non-full-screen window in the activated state is completed, so that the display of the non-full-screen window is diversified and user experience is improved.

An electronic device is further provided according to an embodiment of the present disclosure. The electronic device may be a mobile terminal such as an intelligent mobile phone and a tablet computer. The electronic device includes a touch display unit and a processing unit.

The touch display unit is adapted to convert a full-screen display window of an application by using a conversion parameter, to obtain a non-full-screen window of the application; and display opened M non-full-screen windows in the display region, where N is greater than or equal to 1.

The processing unit is adapted to run multiple applications; perform timing if an interaction in a first non-full-screen window in an activated state is completed; judge whether an interaction event is processed in the first non-full-screen window; stop the timing if the interaction event is processed in the first non-full-screen window; and if no interaction event is processed in the first non-full-screen window, judge whether duration of the timing reaches a predetermined threshold; and if the duration of the timing reaches the predetermined threshold, generate an judgment result and change a display parameter of a functional region of the first non-full-screen window based on the judgment result to change the display effect of the functional region of the first non-full-screen window.

The first non-full-screen window in the activated state may be the one of all the opened non-full-screen windows in which the last interaction event is performed. The interaction event may be the event responding to the user's touch operation. The changing the display effect may include closing or opening the non-full-screen window, changing the color of the non-full-screen window, or changing the transparency of the non-full-screen window.

The display parameter includes at least one of a parameter indicative of whether to display, a parameter indicative of displaying color, and a parameter indicative of displaying transparency.

The processing unit is adapted to change a display parameter of the first non-full-screen window and a display parameter of a functional region of the first non-full-screen window based on the judgment result to change the display effect of the first non-full-screen window and the functional region of the first non-full-screen window.

The processing unit is adapted to extract graphics buffer data of the functional region of the first non-full-screen window; and based on the judgment result, change RGB (Red, Green, Blue) information and/or transparency information of each pixel in the graphics buffer data of the functional region, or not display the graphics buffer data of the functional region, i.e., not add the graphics buffer data of the functional region into the next frame buffer data.

The graphics buffer data includes position coordinate, RGB information and transparency information of each pixel.

In this way, the display effect of the non-full-screen window can be changed automatically after a time period since the last operation in the non-full-screen window is completed, so that the non-full-screen window becomes more suitable for the user to use and the visual experience is better.

The processing unit is further adapted to determine an application to be run in a non-full-screen manner to obtain a default matrix; and convert a full-screen display window of the application by using the default matrix to obtain a display area of a non-full-screen window of the application.

The processing unit is adapted to determine graphics buffer data of the application; convert the graphics buffer data by using the default matrix; generate frame buffer data of the touch display unit by using the graphics buffer data; and display the non-full-screen window of the application in the touch display unit by using the frame buffer data.

For a case that there may be an overlap region between two non-full-screen windows of two applications, coordination information of pixels in the graphic buffer data of the application corresponding to the non-full-screen window is set to three-dimensional coordinate $(x_o, y_o, z_o)$, and each non-full-screen window has a unique third dimension coordinate $z_o$. Therefore, the multiple non-full-screen windows may be differentiated by different third dimension coordinates $z_o$ if there is an overlap region between two on-full-screen windows or a non-full-screen window is totally covered by another non-full-screen window.

The default matrix may be a unit matrix. The expanded three-dimensional coordinate ($x_o$, $y_o$, $z_o$) in the graphic buffer data may be converted by using the default matrix to obtain the non-full-screen window of the application. The graphic buffer data corresponding to the non-full-screen window includes the converted ($x_o$, $y_o$, $z_o$) and RGB information of respective pixels.

In this way, the full-screen window of the application may be converted to a non-full-screen window of the application by the conversion matrix. Therefore, by providing multiple non-full-screen windows of applications, the user may flexibly view the content in any application running in a non-full-screen manner.

Preferably, the non-full-screen window may be adjusted by adjusting the conversion matrix of the non-full-screen window.

For example, if the non-full-screen window scaled down by ½ times, the conversion matrix of the non-full-screen window is converted into $$\begin{pmatrix} 1/2 & 0 & 0 \\ 0 & 1/2 & 0 \\ 0 & 0 & 1/2 \end{pmatrix}$$

based on corresponding information, and the three-dimensional coordinate ($x_t$, $y_t$, $z_t$) of each pixel in the frame buffer data corresponding to the non-full-screen window is:

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix};$$

If the non-full-screen window is further moved laterally by $\Delta x$ and longitudinally by $\Delta y$, the conversion matrix of the non-full-screen window is $$\begin{pmatrix} 1/2 & 0 & \Delta x \\ 0 & 1/2 & \Delta y \\ 0 & 0 & 1/2 \end{pmatrix},$$

and the three-dimensional coordinate ($x_t$, $y_t$, $z_t$) of each pixel in the frame buffer data corresponding to the non-full-screen window is:

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix}.$$

Preferably, the processing unit is adapted to change the display effect of the functional region according to user's operation. For example, a functional region is displayed in the non-full-screen window in the activated state if it is judged that an interaction event is performed in the non-full-screen window in the activated state.

Therefore, with the method of the embodiment, the display effect of the non-full-screen window and its corresponding functional region may be changed after a time period since the last operation in the non-full-screen window in the activated state is completed, so that the display of the non-full-screen window is diversified and user experience is improved.

Figure 13:
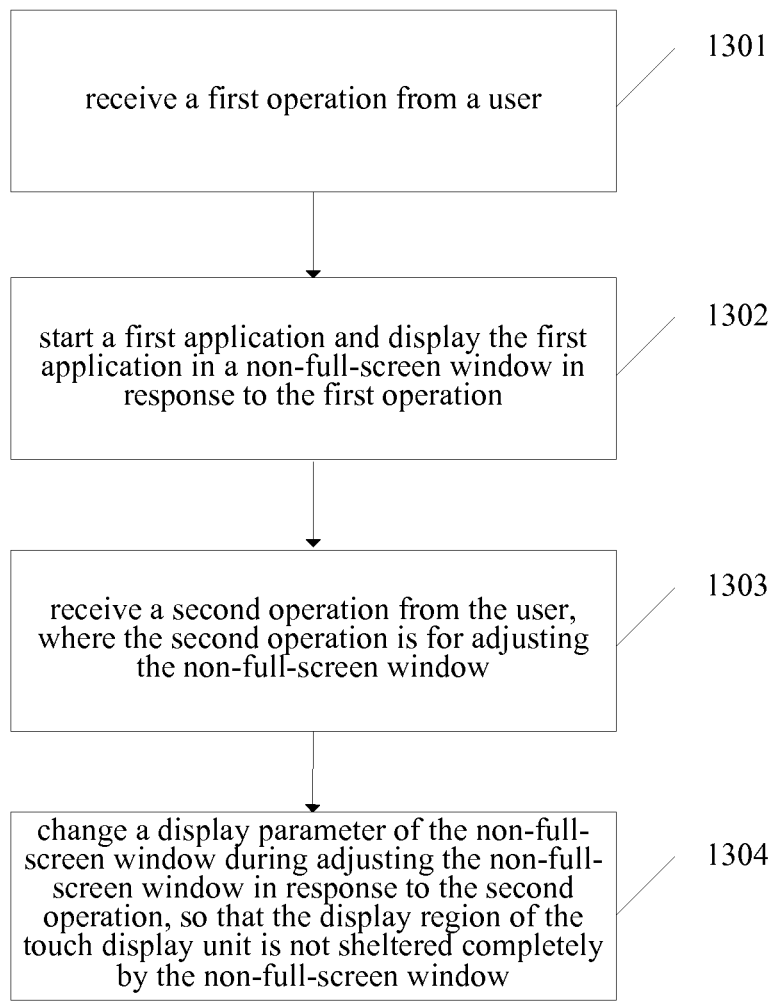
FIG. 13 is a flow chart of an information processing method according to an embodiment of the present disclosure.

An information processing method applied to an electronic device is provided according to an embodiment of the disclosure. The electronic device includes a touch display unit including a display region. As shown in FIG. 13, the method includes the following steps S1301 to S1304.

Step 1301 is receiving a first operation from a user.

Step 1302 is running a first application and displaying the first application in a non-full-screen window in response to the first operation.

Step 1303 is receiving a second operation from the user, where the second operation is for adjusting the non-full-screen window.

Step 1304 is to changing a display parameter of the non-full-screen window during adjusting the non-full-screen window in response to the second operation, so that the display region of the touch display unit is not completely sheltered by the non-full-screen window.

A case that the electronic device is a mobile phone is taken as an example. With the development of the intelligent mobile phone, the screen of the mobile phone is designed to be larger, and thus multi-window display can be supported. The window herein refers to a window in which an application is displayed on the mobile phone, which is not described in detail herein.

However, conventionally, when multiple applications are run on the mobile phone, only one of the applications that is being operated is in the foreground, i.e., only one application window is in the foreground on the screen of the mobile phone, and other applications are in the background, i.e., other application windows are in the background. If one of the other application windows is to be used, switch needs to be performed between the other application window and the application window being in the foreground. That is, conventionally, although multiple applications are running at the same time, only one application window is in an activated state on the screen of the mobile phone, and only content information of the application being displayed in the application window can be seen by the user, which results in a bad experience and which is not benefit to user operation. In addition, frequent switching of the application windows between the foreground and the background takes a lot of system resources. However, in the embodiment of the disclosure, a first application may be started in a non-full-screen window, so that the first application is displayed in the display region in a form of window. That is, multi-window display is supported in the embodiment of the disclosure, and it is supported to display multiple applications in multiple windows which are all in the foreground. Therefore, no switching between the foreground and the background is needed, which is benefit to user operation, and the system resources taken for the frequently switching between the foreground and the background is saved. Here, starting the first application in a non-full-screen window may also be referred to as starting the first application in a small window.

In the embodiment of the disclosure, the multi-window display is supported. Since the display of the window is changed by changing the display parameter of the window during adjusting the window, the user can distinguish the window being adjusted according to the display effect of the window. In a case that multiple windows are displayed in the display region, the display effect of the window being adjusted is changed, while the display effect of other windows are not changed, therefore, the window whose display effect is changed is the window being adjusted.

With the embodiment of the disclosure, since the display effect of the window can be changed, the display region is not sheltered completely by the window. If the window is changed to be transparent, other contents in the display region can be seen, and thus the user can see the information content in the display region of the mobile phone during the adjusting.

Figure 14:
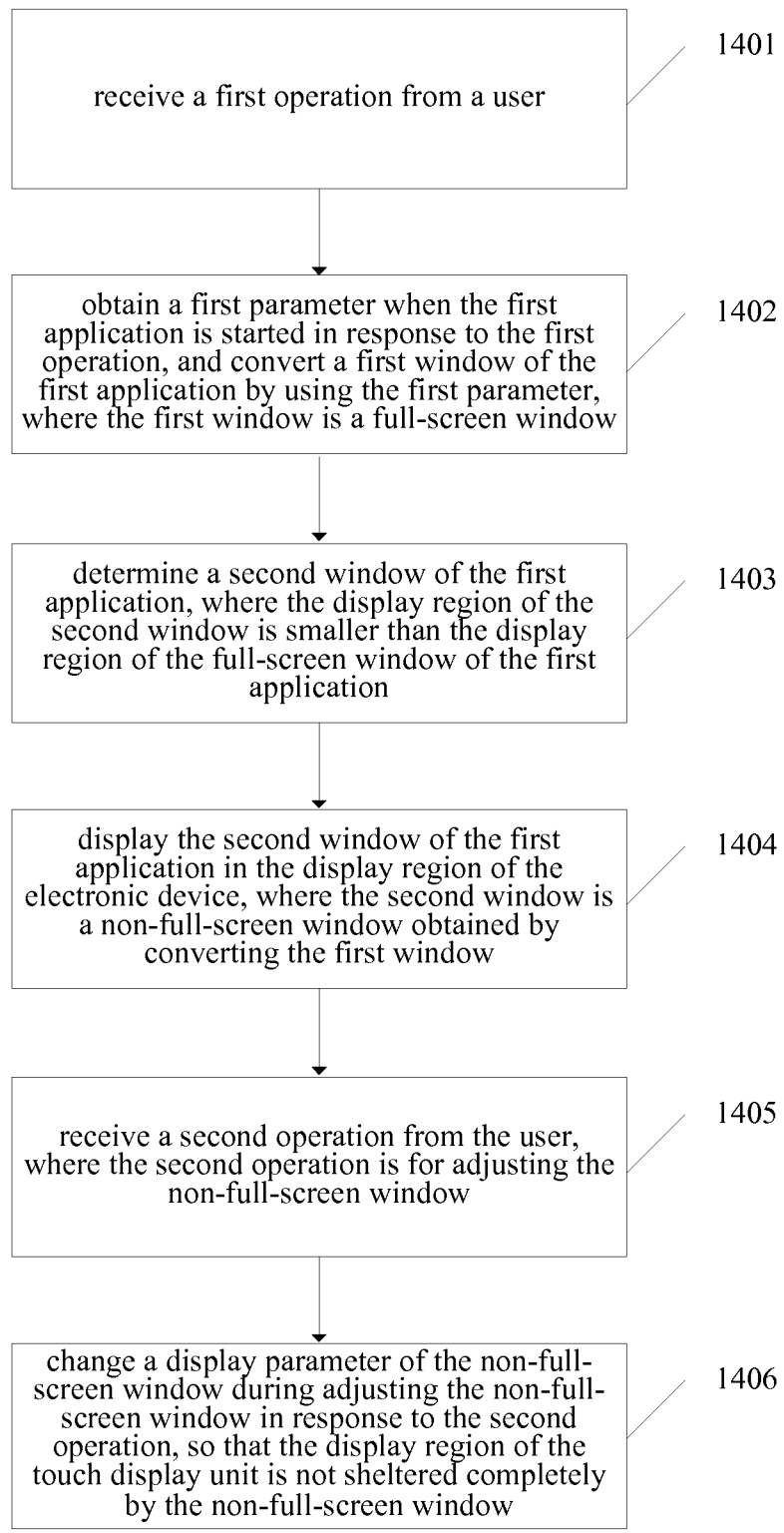
FIG. 14 is a flow chart of an information processing method according to an embodiment of the present disclosure.

An information processing method applied to an electronic device is provided according to an embodiment of the disclosure. The electronic device includes a touch display unit including a display region. As shown in FIG. 14, the method includes the following steps S1401 to S1406.

Step 1401 is receiving a first operation from a user.

Step 1402 is obtaining a first parameter when the first application is started in response to the first operation, and converting a first window of the first application by using the first parameter, where the first window is a full-screen window.

It is to be noted that the first parameter is a conversion parameter for converting the window, and at least includes a parameter value, a matrix, a parameter group or a parameter set.

If the first parameter is a matrix, the first parameter may be referred to as a first conversion matrix, which is further referred to as a first matrix below for convenience.

Step 1403 is determining a second window of the first application, where the display region of the second window is smaller than the display region of the full-screen window of the first application.

Step 1404 is displaying the second window of the first application in the display region of the electronic device, where the second window is a non-full-screen window obtained by converting the first window.

Step 1405 is receiving a second operation from the user, where the second operation is for adjusting the non-full-screen window.

Step 1406 is changing a display parameter of the non-full-screen window during adjusting the non-full-screen window in response to the second operation, so that the display region on the touch display unit is not sheltered completely by the non-full-screen window.

A case that the electronic device is a mobile phone is taken as an example. With the development of the intelligent mobile phone, the screen of the mobile phone is designed to be larger, and thus multi-window display can be supported. The window herein refers to a window in which an application is displayed on the mobile phone, which is not described in detail herein.

However, conventionally, when multiple applications are run on the mobile phone, only one of the applications that is being operated is in the foreground, i.e., only one application window is in the foreground on the screen of the mobile phone, and other applications are in the background, i.e., other application windows are in the background. If one of the other application windows is to be used, switch needs to be performed between the other application window and the application window being in the foreground. That is, conventionally, although multiple applications are running at the same time, only one application window is in an activated state on the screen of the mobile phone, and only content information of the application being displayed in the application window can be seen by the user, which results in a bad experience and which is not benefit to user operation. In addition, frequent switching of the application windows between the foreground and the background takes a lot of system resources. However, in the embodiment of the disclosure, a first application may be started in a non-full-screen window, so that the first application is displayed in the display region in a form of window. That is, multi-window display is supported in the embodiment of the disclosure, and it is supported to display multiple applications in multiple windows which are all in the foreground. Therefore, no switching between the foreground and the background is needed, which is benefit to user operation, and the system resources taken for the frequently switching between the foreground and the background is saved. Here, starting the first application in a non-full-screen window may also be referred to as starting the first application in a small window.

In the embodiment of the disclosure, the multi-window display is supported. Since the display of the window is changed by changing the display parameter of the window during adjusting the window, the user can distinguish the window being adjusted according to the display effect of the window. In a case that multiple windows are displayed in the display region, the display effect of the window being adjusted is changed, while the display effect of other windows are not changed, therefore, the window whose display effect is changed is the window being adjusted.

Figure 15:
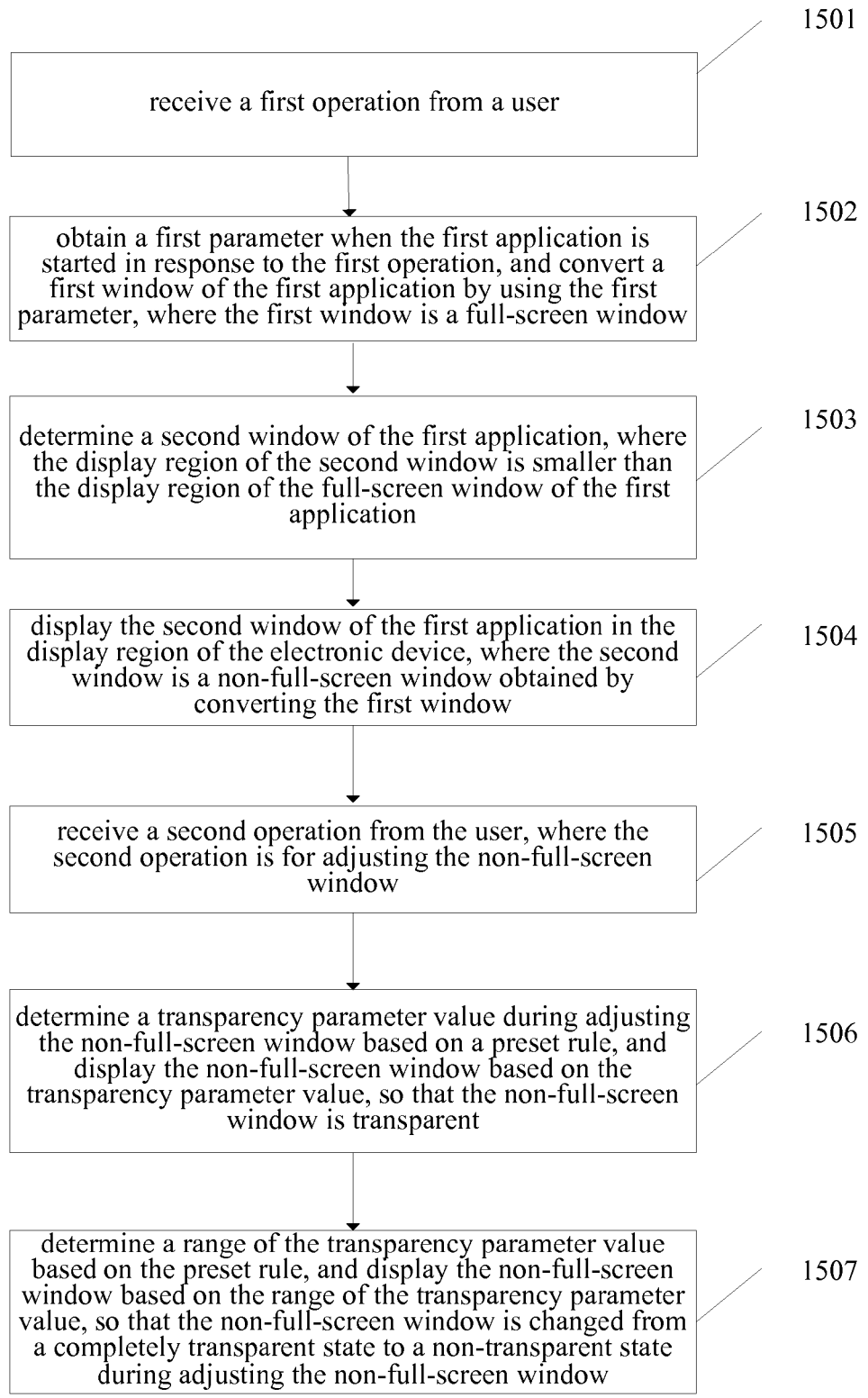
FIG. 15 is a flow chart of an information processing method according to an embodiment of the present disclosure.

An information processing method is further provided according to an embodiment of the disclosure. The electronic device includes a touch display unit including a display region. As shown in FIG. 15, the method includes the following steps S1501 to S1507.

Step 1501 is receiving a first operation from a user.

Step 1502 is obtaining a first parameter when the first application is started in response to the first operation, and converting a first window of the first application by using the first parameter, where the first window is a full-screen window.

It is to be noted that the first parameter is a conversion parameter for converting the window, and at least includes a parameter value, a matrix, a parameter group or a parameter set.

If the first parameter is a matrix, the first parameter may be referred to as a first conversion matrix, which is further referred to as a first matrix below for convenience.

Step 1503 is determining a second window of the first application, where the display region of the second window is smaller than the display region of the full-screen window of the first application.

Step 1504 is displaying the second window of the first application in the display region of the electronic device, where the second window is a non-full-screen window obtained by converting the first window.

Step 1505 is receiving a second operation from the user, where the second operation is for adjusting the non-full-screen window.

Step 1506 is determining a transparency parameter value based on a preset rule during adjusting the non-full-screen window, and displaying the non-full-screen window based on the transparency parameter value, so that the non-full-screen window is transparent.

Step 1507 is determining a range of the transparency parameter value based on the preset rule, and display the non-full-screen window based on the range of the transparency parameter value, so that the non-full-screen window is gradually changed from a completely transparent state to a non-transparent state.

Any one of step 1506 and step 1507 may be selected to perform. Alternatively, step 1506 may be performed in conjunction with step 1507, and the sequence thereof is not limited.

A case that the electronic device is a mobile phone is taken as an example. With the development of the intelligent mobile phone, the screen of the mobile phone is designed to be larger, and thus multi-window display can be supported. The window herein refers to a window in which an application is displayed on the mobile phone, which is not described in detail herein.

However, conventionally, when multiple applications are run on the mobile phone, only one of the applications that is being operated is in the foreground, i.e., only one application window is in the foreground on the screen of the mobile phone, and other applications are in the background, i.e., other application windows are in the background. If one of the other application windows is to be used, switch needs to be performed between the other application window and the application window being in the foreground. That is, conventionally, although multiple applications are running at the same time, only one application window is in an activated state on the screen of the mobile phone, and only content information of the application being displayed in the application window can be seen by the user, which results in a bad experience and which is not benefit to user operation. In addition, frequent switching of the application windows between the foreground and the background takes a lot of system resources. However, in the embodiment of the disclosure, a first application may be started in a non-full-screen window, so that the first application is displayed in the display region in a form of window. That is, multi-window display is supported in the embodiment of the disclosure, and it is supported to display multiple applications in multiple windows which are all in the foreground. Therefore, no switching between the foreground and the background is needed, which is benefit to user operation, and the system resources taken for the frequently switching between the foreground and the background is saved. Here, starting the first application in a non-full-screen window may also be referred to as starting the first application in a small window.

In the embodiment of the disclosure, the multi-window display is supported. Since the display of the window is changed by changing the display parameter of the window during adjusting the window, the user can distinguish the window being adjusted according to the display effect of the window. In a case that multiple windows are displayed in the display region, the display effect of the window being adjusted is changed, while the display effect of other windows are not changed, therefore, the window whose display effect is changed is the window being adjusted.

With the embodiment of the disclosure, since the display effect of the window can be changed, the display region is not sheltered completely by the window. If the window is changed to be transparent, other contents in the display region can be seen, and thus the user can see the information content in the display region of the mobile phone during the adjusting.

Figure 16:
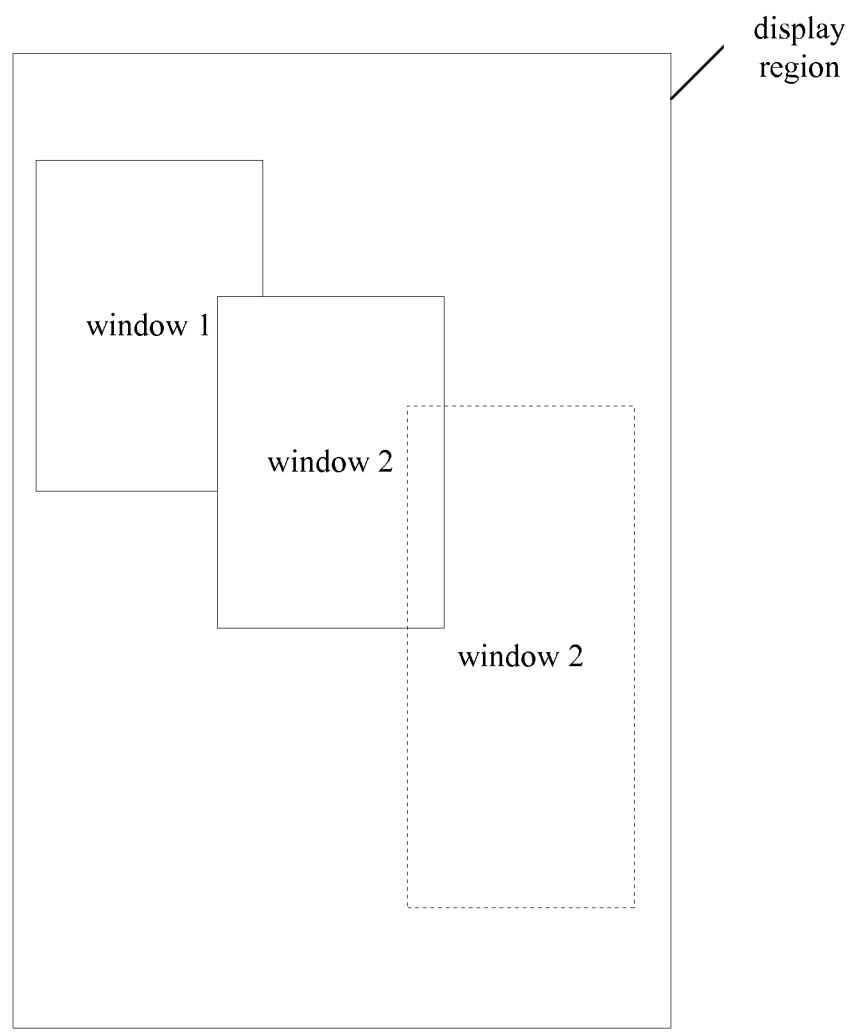
FIG. 16 is a schematic diagram of an effect of a completely transparent window according to an embodiment of the present disclosure.
Figure 17:
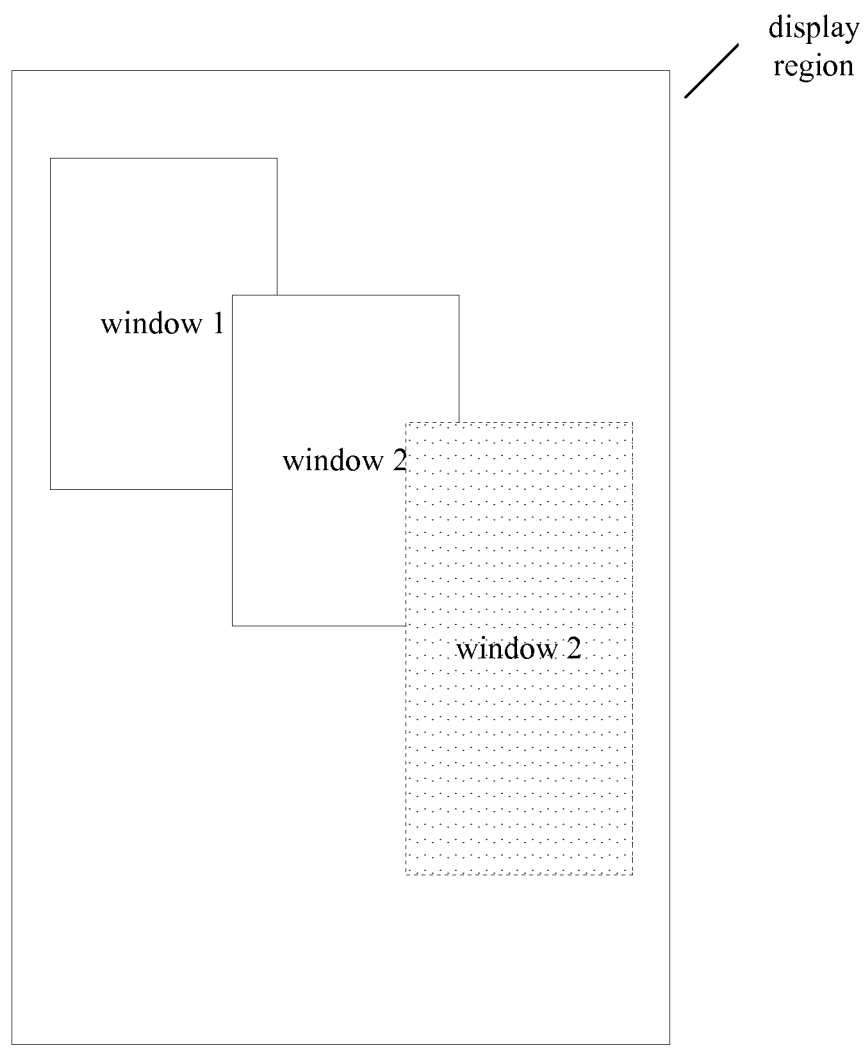
FIG. 17 is a schematic diagram of an effect of a translucent window according to an embodiment of the present disclosure.
Figure 18:
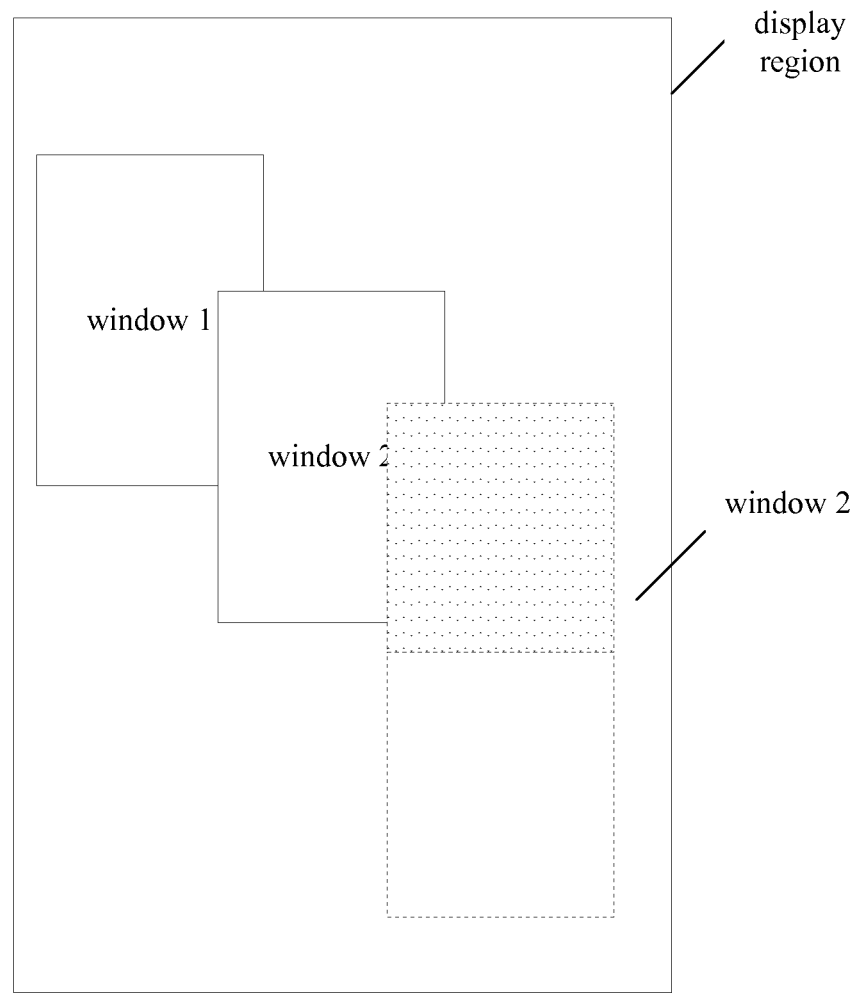
FIG. 18 is a schematic diagram of an effect of a window half of which is completely transparent and half of which is translucent according to an embodiment of the present disclosure.

In the embodiment of the disclosure, for the effect of the window being adjusted, the window may be adjusted to be completely transparent, or translucent, or partly completely transparent and partly translucent based on the transparency parameter value, as shown in FIG. 16 to FIG. 18 respectively. In FIG. 16, there are two non-full-screen windows in the display region, where window 2 is changed from an initial non-transparent state to a completely transparent state during the adjusting. In FIG. 17, there are two non-full-screen windows in the display region, where window 2 is changed from an initial non-transparent state to a translucent state during the adjusting. For convenience, the translucent effect is shown by filling with shadows. In FIG. 18, there are two non-full-screen windows in the display region, where window 2 is changed from an initial non-transparent state to a partly completely transparent and partly translucent state during the adjusting. For convenience, the translucent part is shown by filling with shadows. In FIG. 18, the completely transparent part and the translucent part are respectively half of window 2; however, the proportion is not limited therein and may be any values in practice.

In the embodiment of the disclosure, a range of the transparency parameter value may be determined based on a preset rule, so that the window is gradually changed in a range from a completely transparent state to a translucent state based on the range of the transparency parameter value, which is not shown in the drawings. For example, window 2 is completely transparent at the beginning of the adjusting, and gradually becomes translucent based on the range of the transparency parameter value during adjusting the window. Alternatively, window 2 may be gradually changed from a translucent state to a completely transparent state based on the range of the transparency parameter value during adjusting the window. The disclosure is not limited herein.

Figure 19:
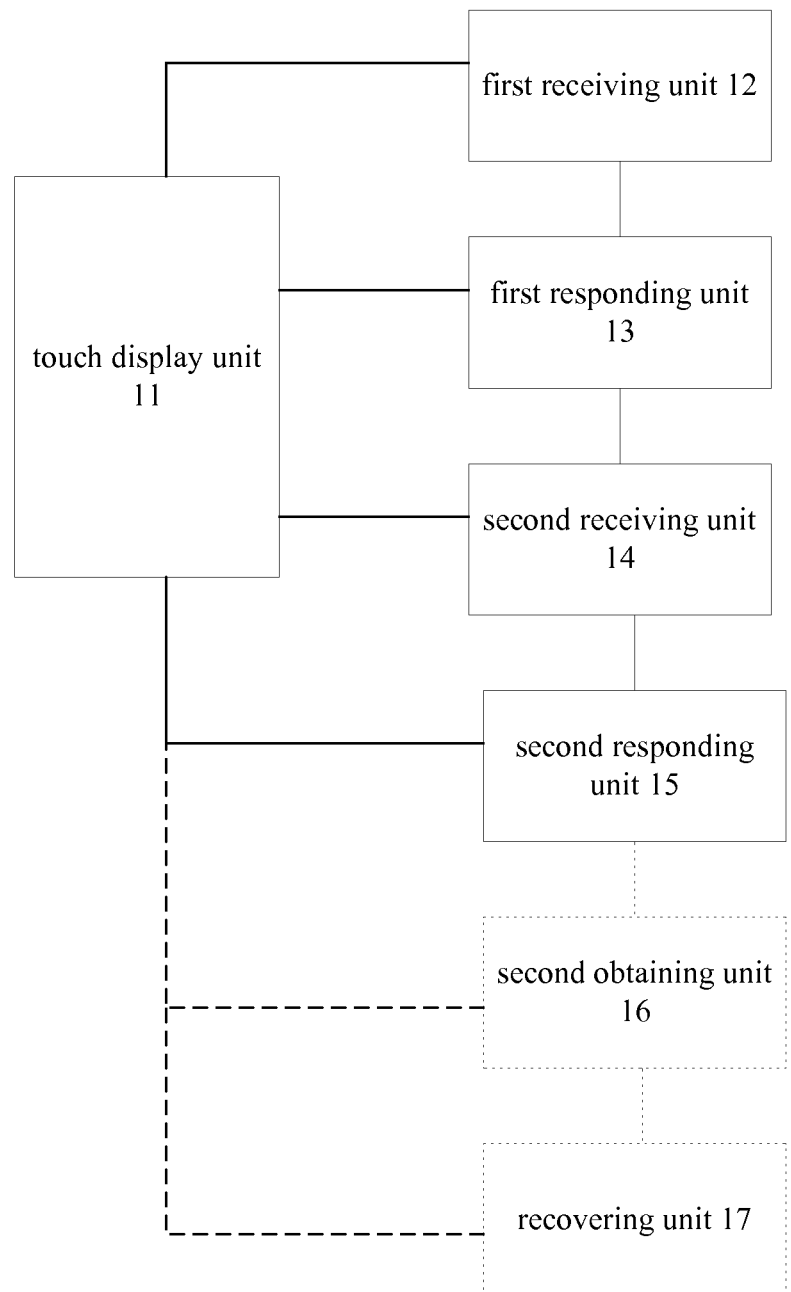
FIG. 19 is a schematic structural diagram of an electronic device according to an embodiment of the disclosure.

Based on the above embodiments, the method further includes: before responding to the second operation, obtaining an initial display parameter value of the non-full-screen window and saving the initial display parameter value; and changing the transparency parameter value to the initial display parameter value after the non-full-screen window is adjusted, so that the display effect of the non-full-screen window is recovered to the display effect before the adjusting. For example, the window is non-transparent before the adjusting, and then changed to be completely transparent, or translucent or partly completely transparent and partly translucent during the adjusting as shown in FIG. 17 to FIG. 19, and finally recovered to be the non-transparent again. In the embodiment of the disclosure, the display of the window can be changed to make the display region not completely sheltered by the window. If the window is transparent, other contents in the display region is not sheltered, and thus the user can see information content in the display region of the mobile phone during the adjusting.

In a preferred embodiment of the disclosure, if the first parameter is a matrix, for step 1502 to step 1504, the first application is displayed in the display region in a form of a converted window obtained by matrix conversion based on a matrix conversion principle. The matrix conversion principle is as follows.

1) Obtaining a first matrix when the first application is started in response to the first operation, and converting a first window of the first application by using the first matrix, where the first window is a full-screen window; and determining a second window of the first application, where the display region of the second window is smaller than the display region of the full-screen window of the first application. In this way, the position of the second window is determined.

2) Reading graphic buffer data of the first application, combing the graphic buffer data into frame buffer data corresponding to the display region of the electronic device; and drawing in the display region of the electronic device by using the frame buffer data, so as to display a second window of the first application in the display region of the electronic device. In this way, the second window is drawn, and the drawn second window is displayed in the display region based on the determined position of the second window. The second window is a non-full-screen window obtained by performing the matrix conversion on the first window.

The above matrix conversion principle is described in detail in the following examples.

In the following, it is illustrated by taking a case that two applications are displayed within second window interfaces, i.e., two applications are displayed in a non-full-screen manner, as an example. The method includes the following steps S1601 to S1603.

Step 1601 is reading graphic buffer data of a first window of an application.

The two applications write graphics buffer data for full-screen display drawn by themselves into a graphics buffer. The graphics buffer data includes two-dimensional coordinate information and RGB (Red Green Blue) color information of each pixel.

Step 1602 is converting the graphic buffer data of the first window into graphic buffer data of a second window by using a first matrix, and combining the graphic buffer data of the second window into frame buffer data of the touch display unit.

A case that there is an overlap region between the second windows is considered. As shown in FIG. 14b, there is an overlap region between the second window 1 and the second window 2. Accordingly, in the embodiment, two-dimensional coordinate $(x_o, y_o)$ of a pixel in the graphics buffer data of the first window is expanded into three-dimensional coordinate $(x_o, y_o, z_o)$, and different second windows have different third dimensional coordinates $z_o$. Therefore, the second window can be differentiated by different third dimensional coordinate, so that the overlap relationship of the overlap region between the different display regions of the second windows can be determined. For example, in a case that there is an overlap region between the second window 1 and the second window 2 and the third dimensional coordinate of the second window 2 is farther from the coordinate origin than the third dimensional coordinate of the second window 1, it is identified that part of the display region of the second window 1 is overlapped by the second window 2, and the overlap region between the second window 1 and the second window 2 is used for the second window 2.

The graphics buffer data read in S1601 is combined with graphics buffer data of regular applications (such as status bar) in the electronic device, to form frame buffer data, i.e., content displayed by the electronic device in a full-screen manner. Therefore, in the embodiment, the expanded three-dimensional coordinate $(x_o, y_o, z_o)$ in the graphics buffer data is converted by utilizing the first matrix, thus the full-screen window, i.e., the first window of the application is converted into the second window, i.e., a non-full-screen window. The converted graphics buffer data includes the converted $(x_o, y_o, z_o)$ and RGB information of the pixels.

A case that a first window is scaled down by ½ times to obtain a second window is taken as an example. The first matrix is $$\begin{pmatrix} 1/2 & 0 & 0 \\ 0 & 1/2 & 0 \\ 0 & 0 & 1/2 \end{pmatrix},$$

and the three-dimensional coordinate $(x_t, y_t, z_t)$ of the pixel in the frame buffer data corresponding to the second window is shown as equation (1):

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix} \quad (1)$$

A case that a first window is scaled down by ½ times to obtain a second window and the second window is displaced $\Delta x$ in the horizontal direction and $\Delta y$ in the vertical direction is taken as an example. The first matrix is $$\begin{pmatrix} 1/2 & 0 & \Delta x \\ 0 & 1/2 & \Delta y \\ 0 & 0 & 1/2 \end{pmatrix},$$

and the three-dimensional coordinate $(x_t, y_t, z_t)$ of the pixel in the frame buffer data corresponding to the second window is shown as equation (2):

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix} \quad (2)$$

A case that a first window is scaled down by ½ times to obtain a second window and the second window is rotated clockwise by θ degrees is taken as an example. The first matrix is $$\begin{pmatrix} \cos\theta/2 & 0 & 0 \\ 0 & \cos\theta/2 & 0 \\ 0 & 0 & \cos\theta/2 \end{pmatrix},$$

and the three-dimensional coordinate $(x_t, y_t, z_t)$ of the pixel in the frame buffer data corresponding to the second window is shown as equation (3):

$$(x_t, y_t, z_t) = \begin{pmatrix} \cos\theta/2 & 0 & 0 \\ 0 & \cos\theta/2 & 0 \\ 0 & 0 & \cos\theta/2 \end{pmatrix} \times \begin{pmatrix} x_o \\ y_o \\ z_o \end{pmatrix} \quad (3)$$

In practice, in concerting the first window into the second window firstly, the initial position of the second window in the touch display unit may be preset. Alternatively, the user of the electronic device may specify a region in the touch display unit of the electronic device by interactive operations, and the specified region is used as the display region of the second window. After the second window is displayed, a touch operation for zooming, moving or rotating the second window may be received, then the touch operation is analyzed to obtain a parameter for zooming, moving or rotating the second window, and step 1602 is performed.

Step 1603 is displaying the second window of the application in the touch display unit by using the frame buffer data, where the second window is used to replace the first window, so that the application is displayed in the second window.

A case that the electronic device is a mobile phone is taken as an example. With the development of the intelligent mobile phone, the screen of the mobile phone is designed to be larger, and thus multi-window display can be supported. The window herein refers to a window in which an application is displayed on the mobile phone, which is not described in detail herein.

However, conventionally, when multiple applications are run on the mobile phone, only one of the applications that is being operated is in the foreground, i.e., only one application window is in the foreground on the screen of the mobile phone, and other applications are in the background, i.e., other application windows are in the background. If one of the other application windows is to be used, switch needs to be performed between the other application window and the application window being in the foreground. That is, conventionally, although multiple applications are running at the same time, only one application window is in an activated state on the screen of the mobile phone, and only content information of the application being displayed in the application window can be seen by the user, which results in a bad experience and which is not benefit to user operation. In addition, frequent switching of the application windows between the foreground and the background takes a lot of system resources. However, in the embodiment of the disclosure, a first application may be started in a non-full-screen window, so that the first application is displayed in the display region in a form of window. That is, multi-window display is supported in the embodiment of the disclosure, and it is supported to display multiple applications in multiple windows which are all in the foreground. Therefore, no switching between the foreground and the background is needed, which is benefit to user operation, and the system resources taken for the frequently switching between the foreground and the background is saved. Here, starting the first application in a non-full-screen window may also be referred to as starting the first application in a small window.

In the embodiment of the disclosure, the multi-window display is supported. The first application is started in a non-full window manner in response to the first operation, so that the first application is displayed in the display region in a form of a window obtained after the matrix conversion. Difference from the existing operation, the window conversion is performed by using the above matrix conversion principle, that is, it is considered that each of the multiple windows that are opened in the display region is in the foreground, and each window is displayed in the display region in a non-full-screen manner (small window manner). This conversion is to establish a matrix conversion between a window that is opened originally in a normal full-screen manner and a window that is opened in a small window manner, to achieve the mutual conversion.

In the embodiment of the disclosure, the multi-window display is supported. Since the display of the window is changed by changing the display parameter of the window during adjusting the window, the user can distinguish the window being adjusted according to the display effect of the window. In a case that multiple windows are displayed in the display region, the display effect of the window being adjusted is changed, while the display effect of other windows are not changed, therefore, the window whose display effect is changed is the window being adjusted.

With the embodiment of the disclosure, since the display effect of the window can be changed, the display region is not sheltered completely by the window. If the window is changed to be transparent, other contents in the display region can be seen, and thus the user can see the information content in the display region of the mobile phone during the adjusting.

In the embodiment of the disclosure, for the effect of the window being adjusted, the window may be adjusted to be completely transparent, or translucent, or partly completely transparent and partly translucent based on the transparency parameter value, as shown in FIG. 16 to FIG. 18 respectively. In FIG. 16, there are two non-full-screen windows in the display region, where window 2 is changed from an initial non-transparent state to a completely transparent state during the adjusting. In FIG. 17, there are two non-full-screen windows in the display region, where window 2 is changed from an initial non-transparent state to a translucent state during the adjusting. For convenience, the translucent effect is shown by filling with shadows. In FIG. 18, there are two non-full-screen windows in the display region, where window 2 is changed from an initial non-transparent state to a partly completely transparent and partly translucent state during the adjusting. For convenience, the translucent part is shown by filling with shadows. In FIG. 18, the completely transparent part and the translucent part are respectively half of window 2; however, the proportion is not limited therein and may be any values in practice.

The following descriptions are given by taking a specific application scene as an example.

QQ and a home page of a browser both of which are displayed in a non-full-screen manner are opened by the user on the electronic device. For convenience, the non-full-screen window in which QQ is displayed in referred to as window 1, and the non-full-screen window in which the home page of the browser is displayed in referred to as window 2. If window 2 is zoomed or moved by the user, the display effect of the window is change, as shown in FIG. 16 to FIG. 18, window 2 and window 1 are overlapped and window 1 is not completely sheltered by window 2. Alternatively, in a case that window 1 is covered by window 2, window 1 still can be seen even if window 1 is completely sheltered by window 2 because window 2 is transparent. Therefore, window 2 can be zoomed or moved based on display content of window 1 which can be seen by the user Since window 2 is transparent.

It is to be noted that the electronic device described below is similar to the above method, and have the same advantages as the method, which is not described in detail herein. Technical details that are not disclosed in the device embodiment may refer to the description of the method embodiment.

An electronic device is provided according to an embodiment of the disclosure. As shown in FIG. 19, the electronic device includes a touch display unit 11 including a display region. The electronic device further includes a first receiving unit 12, a first responding unit 13, a second receiving unit 14 and a second responding unit 15.

The first receiving unit 12 is adapted to receive a first operation from a user.

The first responding unit 13 is adapted to start a first application and display the first application in a non-full-screen window in response to the first operation.

The second receiving unit 14 is adapted to receive a second operation from the user, where the second operation is for adjusting the non-full-screen window.

The second responding unit 15 is adapted to change a display parameter of the non-full-screen window during adjusting the non-full-screen window in response to the second operation, so that the display region of the touch display unit is not sheltered completely by the non-full-screen window.

An electronic device is provided according to an embodiment of the disclosure. As shown in FIG. 19, the electronic device includes a touch display unit 11 including a display region. The electronic device further includes a first receiving unit 12 and a first responding unit 13.

The first receiving unit 12 is adapted to receive a first operation from a user.

The first responding unit 13 is adapted to obtain a first parameter when the first application is started in response to the first operation, and convert a first window of the first application by using the first parameter, where the first window is a full-screen window; determine a second window of the first application, where the display region of the second window is smaller than the display region of the full-screen window of the first application; and display the second window of the first application in the display region of the electronic device, where the second window is a non-full-screen window obtained by converting the first window.

It is to be noted that in the embodiment, the first parameter is a conversion parameter for converting the window, and at least includes a parameter value, a matrix, a parameter group or a parameter set.

In a case that the first parameter is a matrix, reference can be made to the content described in detail in the above method embodiment about how the non-full-screen window is obtained by the matrix conversion, which is not described in detail here.

An electronic device is provided according to an embodiment of the disclosure. As shown in FIG. 19, the electronic device includes a touch display unit 11 including a display region. The electronic device further includes a first receiving unit 12, a first responding unit 13, a second receiving unit 14 and a second responding unit 15.

The first receiving unit 12 is adapted to receive a first operation from a user.

The first responding unit 13 is adapted to obtain a first parameter when the first application is started in response to the first operation, and convert a first window of the first application by using the first parameter, where the first window is a full-screen window; determine a second window of the first application, where the display region of the second window is smaller than the display region of the full-screen window of the first application; and display the second window of the first application in the display region of the electronic device, where the second window is a non-full-screen window obtained by converting the first window.

The second receiving unit 14 is adapted to receive a second operation from the user, where the second operation is for adjusting the non-full-screen window.

The second responding unit 15 is adapted to determine a transparency parameter value based on a preset rule during adjusting the non-full-screen window, and display the non-full-screen window based on the transparency parameter value, so that the non-full-screen window is transparent.

It is to be noted that in the embodiment, the first parameter is a conversion parameter for converting the window, and at least includes a parameter value, a matrix, a parameter group or a parameter set.

In a case that the first parameter is a matrix, reference can be made to the content described in detail in the above method embodiment about how the non-full-screen window is obtained by the matrix conversion, which is not described in detail herein.

In a preferred embodiment of the disclosure, the second responding unit 15 is further adapted to determine a range of the transparency parameter value based on the preset rule, and display the non-full-screen window based on the range of the transparency parameter value, so that the non-full-screen window is gradually changed from a completely transparent state to a non-transparent state during adjusting the non-full-screen window.

An electronic device is provided according to an embodiment of the disclosure. As shown in FIG. 19, the electronic device includes a touch display unit 11 including a display region. The electronic device further includes a first receiving unit 12, a first responding unit 13, a second receiving unit 14, a second responding unit 15, a second obtaining unit 16 and a recovering unit 17.

The first receiving unit 12 is adapted to receive a first operation from a user.

The first responding unit 13 is adapted to obtain a first parameter when the first application is started in response to the first operation, and convert a first window of the first application by using the first parameter, where the first window is a full-screen window; determine a second window of the first application, where the display region of the second window is smaller than the display region of the full-screen window of the first application; and display the second window of the first application in the display region of the electronic device, where the second window is a non-full-screen window obtained by converting the first window.

The second receiving unit 14 is adapted to receive a second operation from the user, where the second operation is for adjusting the non-full-screen window.

The second responding unit 15 is adapted to determine a transparency parameter value based on a preset rule during adjusting the non-full-screen window, and display the non-full-screen window based on the transparency parameter value, so that the non-full-screen window is transparent.

The second obtaining unit 16 is adapted to, before responding the second operation, acquire an initial display parameter value of the non-full-screen window and save the initial display parameter value.

The recovering unit 17 is adapted to change the transparency parameter value to the initial display parameter value after the non-full-screen window is adjusted, so that the non-full-screen window is recovered to the display effect before the adjusting.

It is to be noted that in this embodiment, the first parameter is a conversion parameter for window conversion, and at least includes a parameter value, a matrix, a parameter group or a parameter set.

In a case that the first parameter is a matrix, reference can be made to the content described in detail in the above method embodiment about how the non-full-screen window is obtained by the matrix conversion, which is not described in detail herein.

In a preferred embodiment of the disclosure, the second responding unit 15 is further adapted to determine a range of the transparency parameter value based on the preset rule, and display the non-full-screen window based on the range of the transparency parameter value, so that the non-full-screen window is changed gradually from a completely transparent state to a non-transparent state.

It should be understood that, in the embodiments of the disclosure, the disclosed devices and methods may be implemented in other ways. The device embodiments described above are only illustrative. For example, the division of the units is only division in logical function, which may be achieved in other ways in practical applications, such as multiple units or members may be combined, or may be integrated into another system, or some features may be omitted or not be performed. In addition, the coupling, or direct coupling or communication connection among individual components that are displayed or discussed may be implemented via indirect coupling or communication connection between some interfaces, devices or units, and may be electrical, mechanical or may be in other forms.

The above units described as separate components may be or may not be separated physically. The component shown as a unit may be or may not be a physical unit, i.e., may be located at one place or may be distributed onto multiple network units. All or part of the units therein may be selected according to actual needs to implement the object of the solution of the embodiment.

In addition, all of the individual function units in the embodiments of the disclosure may be integrated into one processing unit, or each unit may be an independent unit, or may be a unit formed by integrating two or more units. The integrated unit described above may y be implemented in a form of hardware, or may be implemented in a form of hardware and software function units.

Those skilled in the art should understand that the embodiment of the disclosure may be embodied as method, system, or computer program product. Accordingly, the disclosure may be in a form of hardware completely, software completely, or a combination of software and hardware. Moreover, the disclosure may be in a form of a computer program product which is implemented on one or more computer usable and installable media (including but not limited to disk device, CD-ROM and optical device) containing computer usable program codes.

With the above description of the disclosed embodiments, those skilled in the art can practice or use the disclosure. Various modifications to the embodiments are apparent for those skilled in the art. The general principle defined herein can be implemented in other embodiments without departing from the spirit or scope of the present application. Therefore, the present application should not be limited to the embodiments disclosed herein, but has the widest scope that is in conformity with the principle and the novel features disclosed herein.

The invention claimed is:

1. An information processing method, which is applied to an electronic device, wherein the electronic device has a touch display unit, wherein a plurality of applications are capable of being run on the electronic device and displayed in a display region of the touch display unit, wherein a full-screen window of an application is converted by the electronic device by converting coordinates of pixel points of the full-screen window using a conversion parameter to obtain a non-full-screen window of the application and in a case that N non-full-screen windows are opened, and wherein N is greater than or equal to 2, the method comprising:

judging whether a display region of a second non-full-screen window is totally covered by a display region of a first non-full-screen window;

if the display region of the second non-full-screen window is totally covered by the display region of the first non-full-screen window, generating an adjustment instruction and adjusting the first non-full-screen window and/or the second non-full-screen window based on the adjustment instruction to make both the display region of the first non-full-screen window and the display region of the second non-full-screen window displayed partly or totally in the display region of the touch display unit, wherein the conversion parameter comprises a matrix;

performing timing if it is detected that a first interaction event of the first non-full-screen window in an activated state is completed;

judging whether a second interaction event is processed in the first non-full-screen window, and stopping the timing if the second interaction event is processed in the first non-full-screen window;

if no second interaction event is processed in the first non-full-screen window, judging whether duration of the timing reaches a predetermined threshold; and if the duration of the timing reaches the predetermined threshold, generating a judgment result and changing a display parameter of the first non-full-screen window based on the judgment result to change a display effect of the first non-full-screen window.

2. The method according to claim 1, further comprising, before the judging whether a display region of a second non-full-screen window is totally covered by a display region of a first non-full-screen window and if the touch display unit detects a second operation being performed on the first non-full-screen window, analyzing the second operation to obtain an analyzing result and adjusting the display region of the first non-full-screen window based on the analyzing result.

3. The method according to claim 1, wherein the adjusting the first non-full-screen window and/or the second non-full-screen window based on the adjustment instruction to make both the display region of the first non-full-screen window and the display region of the second non-full-screen window displayed partly or totally in the display region of the touch display unit comprises:

adjusting a conversion parameter of the first non-full-screen window and/or the second non-full-screen window based on an adjustment parameter for adjusting the display region of the first non-full-screen window and/or the second non-full-screen window in the adjustment instruction; and adjusting position of the display region of the first non-full-screen window and/or the display region of the second non-full-screen window by using the conversion parameter to make both the display region of the first non-full-screen window and the display region of the second non-full-screen window displayed partly or totally in the display region of the touch display unit.

4. The method according to claim 1, wherein the display parameter comprises at least one of a parameter indicative of whether to display a parameter indicative of displaying color and a parameter indicative of displaying transparency.

5. The method according to claim 4, wherein the changing of the display parameter of the first non-full-screen window based on the judgment result to change the display effect of the first non-full-screen window comprises:

changing the display parameter of the first non-full-screen window and a display parameter of a functional region of the first non-full-screen window based on the judgment result to change the display effect of the first non-full-screen window and a display effect of the functional region of the first non-full-screen window; or changing the display parameter of the functional region of the first non-full-screen window based on the judgment result to change the display effect of the functional region of the first non-full-screen window.

6. The method according to claim 1, further comprising:
receiving a second operation for adjusting the first non-full-screen window; and
changing a display parameter of the first non-full-screen window during adjusting the first non-full-screen window in response to the second operation to make the display region of the touch display unit not completely sheltered by the first non-full-screen window.

7. The method according to claim 6, wherein the changing of the display parameter of the first non-full-screen window during adjusting the first non-full-screen window comprises determining a transparency parameter value based on a preset rule and displaying the first non-full-screen window based on the transparency parameter value during adjusting the first non-full-screen window to make the first non-full-screen window transparent.

8. The method according to claim 7, further comprising:
determining a range of the transparency parameter value based on the preset rule; and
displaying the first non-full-screen window based on the range of the transparency parameter value to make the first non-full-screen window gradually changed from a completely transparent state to a non-transparent state during adjusting the first non-full-screen window.

9. The method according to claim 7, further comprising, before the changing of the display parameter of the first non-full-screen window during adjusting the first non-full-screen window in response to the second operation, obtaining an initial display parameter value of the first non-full-screen window and saving the initial display parameter value; and
after the changing of the display parameter of the first non-full-screen window during adjusting the first non-full-screen window in response to the second operation, changing the transparency parameter value to the initial display parameter value.

10. An electronic device, comprising:
a touch display unit adapted to
convert a full-screen window of an application by converting coordinates of pixel points of the full-screen window using a conversion parameter to obtain a non-full-screen window of the application, wherein the conversion parameter comprises a matrix, and
display N non-full-screen windows opened in a display region of the touch display unit, where N is greater than or equal to 2; and
a processing unit adapted to
judge whether a display region of a second non-full-screen window is totally covered by a display region of a first non-full-screen window,
if the display region of the second non-full-screen window is totally covered by the display region of the first non-full-screen window, generate an adjustment instruction and adjust the first non-full-screen window and/or the second non-full-screen window based on the adjustment instruction to make both the display region of the first non-full-screen window and the display region of the second non-full-screen window displayed partly or totally in the display region of the touch display unit,
perform timing if it is detected that a first interaction event of the first non-full-screen window in an activated state is completed,
judge whether a second interaction event is processed in the first non-full-screen window, and stop the timing if the second interaction event is processed in the first non-full-screen window;
if no second interaction event is processed in the first non-full-screen window, judge whether duration of the timing reaches a predetermined threshold, and
if the duration of the timing reaches the predetermined threshold, generate a judgment result and change a display parameter of the first non-full-screen window based on the judgment result to change a display effect of the first non-full-screen window.

11. The electronic device according to claim 10, wherein the touch display unit is further adapted to, in a case that a second operation performed on the first non-full-screen window is detected, analyze the second operation to obtain an analyzing result and adjust the display region of the first non-full-screen window based on the analyzing result.

12. The electronic device according to claim 10, wherein the touch display unit is adapted to:
adjust a conversion parameter of the first non-full-screen window and/or the second non-full-screen window based on an adjustment parameter for adjusting the display region of the first non-full-screen window and/or the second non-full-screen window in the adjustment instruction; and
adjust position of the display region of the first non-full-screen window and/or the display region of the second non-full-screen window by using the conversion parameter to make both the display region of first non-full-screen window and the display region of the second non-full-screen window displayed partly or totally in the display region of the touch display unit.

13. The electronic device according to claim 10, wherein the display parameter comprises at least one of a parameter indicative of whether to display a parameter indicative of displaying color and a parameter indicative of displaying transparency.

14. The electronic device according to claim 13, wherein the processing unit is adapted to change the display parameter of the first non-full-screen window and a display parameter of a functional region of the first non-full-screen window based on the judgment result to change the display effect of the first non-full-screen window and a display effect of the functional region of the first non-full-screen window; or
the processing unit is adapted to change the display parameter of the functional region of the first non-full-screen window based on the judgment result to change the display effect of the functional region of the first non-full-screen window.

15. The electronic device according to claim 10, wherein the processing unit comprises:
a second receiving unit adapted to receive a second operation for adjusting the first non-full-screen window; and
a second responding unit adapted to change a display parameter of the first non-full-screen window during adjusting the first non-full-screen window in response to the second operation to make the display region of the touch display unit not completely sheltered by the first non-full-screen window.

16. The electronic device according to claim 15, wherein the second responding unit is further adapted to:
determine a transparency parameter value based on a preset rule; and display the first non-full-screen window based on the transparency parameter value during adjusting the first non-full-screen window to make the first non-full-screen window transparent.

17. The electronic device according to claim 16, wherein the second responding unit is further adapted to:
determine a range of the transparency parameter value based on the preset rule; and
display the first non-full-screen window based on the range of the transparency parameter value to make the first non-full-screen window gradually changed from a completely transparent state to a non-transparent state during adjusting the first non-full-screen window.

18. The electronic device according to claim 16, further comprising:
a second obtaining unit adapted to, before changing the display parameter of the first non-full-screen window during adjusting the first non-full-screen window in response to the second operation, obtain an initial display parameter value of the first non-full-screen window and save the initial display parameter value; and
a recovering unit adapted to, after the changing the display parameter of the first non-full-screen window during adjusting the first non-full-screen window in response to the second operation, change the transparency parameter value to the initial display parameter value.

* * * * *